United States Patent [19]

Shibata et al.

[11] 4,184,054

[45] Jan. 15, 1980

[54] KEY TELEPHONE SYSTEM

[75] Inventors: Shin-ichi Shibata, Hino; Yasuji Sato, Hachioji; Yoshikazu Sano, Hino; Takao Yamamoto, Tanashi, all of Japan

[73] Assignee: Tokyo Shibaura Electric Co., Ltd., Kawasaki, Japan

[21] Appl. No.: 889,657

[22] Filed: Mar. 21, 1978

[30] Foreign Application Priority Data

| Mar. 28, 1977 | [JP] | Japan | 52-34241 |
| Mar. 28, 1977 | [JP] | Japan | 52-34246 |
| Mar. 28, 1977 | [JP] | Japan | 52-34247 |
| Dec. 27, 1977 | [JP] | Japan | 52-159926 |
| Dec. 27, 1977 | [JP] | Japan | 52-159943 |
| Jan. 14, 1978 | [JP] | Japan | 53-3117 |
| Jan. 14, 1978 | [JP] | Japan | 53-3118 |
| Jan. 23, 1978 | [JP] | Japan | 53-6051 |
| Jan. 23, 1978 | [JP] | Japan | 53-6052 |

[51] Int. Cl.$^2$ ................................. H04Q 5/18
[52] U.S. Cl. ........................ 179/99 M; 179/15 BB
[58] Field of Search ............ 179/99, 18 J, 15 AL, 179/15 BB

[56] References Cited

U.S. PATENT DOCUMENTS

| 3,604,857 | 9/1971 | Opferman | 179/99 |
| 3,843,845 | 10/1974 | Ridley | 179/99 |
| 3,973,085 | 8/1976 | Shiff | 179/99 |
| 3,975,594 | 8/1976 | Guntersdorfer | 179/15 BB |
| 4,046,972 | 9/1977 | Huizinga et al. | 179/99 |
| 4,061,887 | 12/1977 | Kasson et al. | 179/99 |
| 4,092,501 | 5/1978 | Suzuki et al. | 179/99 |

*Primary Examiner*—Gerald Brigance
*Attorney, Agent, or Firm*—Cushman, Darby & Cushman

[57] ABSTRACT

A key telephone system is provided which comprises: a plurality of key telephones; a key service unit; a plurality of transmission paths each including a first transmission cable for transmitting a voice signal between the key telephone and key service unit, a second transmission cable for transmitting a first control signal from the key telephone to the key service unit, and a third transmission cable for transmitting a second control signal from the key service unit to the key telephone; first, second and third transformers of which the primary windings are connected to the key telephone and the secondary windings to the first, second and third transmission cables; and fourth, fifth and sixth transformers of which the primary windings are coupled with the first, second and third transmission cables, respectively, and the secondary windings to the key service unit. The key telephone system is further provided with a seventh transformer of which the primary winding is connected to the key telephone, and the secondary winding between the center taps of the secondary windings of the first and second transformers and an eighth transformer of which the primary winding is connected between the center taps of the secondary windings of the fourth and fifth transformers and the secondary winding to the key service unit.

35 Claims, 21 Drawing Figures

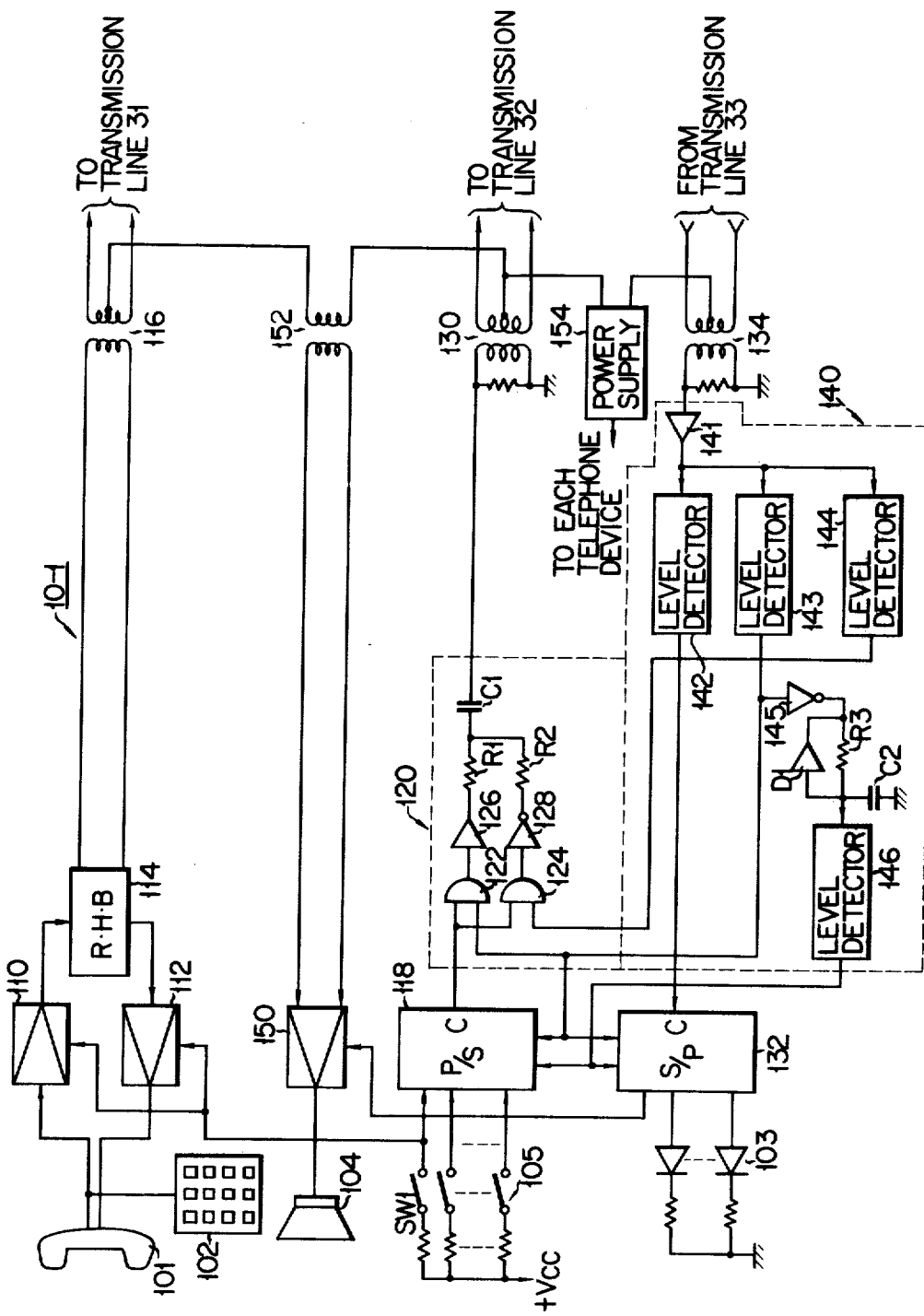

KEY TELEPHONE SYSTEM

BACKGROUND OF THE INVENTION

The present invention relates to a key telephone system in which a plurality of key telephones and a key service unit are coupled by three transmission cables.

A key telephone system has been known in which a voice signal and control signals are transferred through three transmission cables between each of key telephones and a key service unit.

To make a telephone call through this kind of key telephone system, a subscriber picks up the handset of a key telephone, pushes an outside line selection key, and then pushes proper dial buttons. An up-control information signal generated in response to the selection key operation is transmitted to the key service unit through a first transmission cable. Upon receipt of the control signal, the key service unit energizes the crosspoint corresponding to the outside line selected in a crosspoint module to couple the key telephone with the selected outside line through a second transmission cable. In response to an incoming call signal transmitted from a telephone exchange, the key service unit transmits a down-control information signal to the key telephone through a third transmission cable to light the corresponding lamp of the key telephone for indicating the outside line. Then, if a called subscriber picks up the handset and presses the outside line selection key corresponding to the lighted indication lamp, the key telephone and the outside line through which the incoming call signal is transmitted, are connected to complete a message, or communication channel.

As described above, in the conventional key telephone system, the three transmission cables each formed of a pair of wires are used to transmit the voice signal for message, and up- and down-control information signals therethrough. The power is supplied by using the first and third transmission cables for up- and down-control information signals.

In such a conventional key telephone system, it is impossible to trasmit an additional information signal between the key telephone and the key service unit. For example, it impossible to transmit an additional information signal between the key telephone and the key service unit. For example, it is impossible to execute a voice paging for the key telephone being now busy. That is, only one pair of transmission wires, i.e. the second transmission cable is allotted as a message, or communication channel, so that, when used for the message transmission, the second transmission cable can not be used for the voice paging. In the prior art, the second transmission cable is also alloted for the voice paging so that the message transmission is adversely effected. A similar problem is found in the time-division multiplex system when another control information signal is transmitted at a speed different from that of the up- and down-control information signals.

SUMMARY OF THE INVENTION

Accordingly, an object of the present invention is to provide a key telephone system in which an additional information signal can be transmitted by using two of the three transmission cables for transmitting a message signal and up- and down-control information signals.

According to one aspect of the invention, there is provided a key telephone system comprising: at least one key telephone with a plurality of key switches for specifying a line; a key service unit including a crosspoint module and control means; at least one transmission path including first, second and third transmission cables and connecting the key telephone to the key service unit; and coupling means for coupling the key telephone to the key service unit through two of the first, second and third transmission cables to permit a transmission of information signal between the key telephone and the key service unit, wherein, in response to an up-control signal generated in accordance with the key switch operation and supplied through the first transmission cable, the control means provides a control signal to the crosspoint module, couples the key telephone with a specified line through the third transmission cable and the crosspoint module, and transmits a down-control information signal through the second transmission cable in response to incoming call signal transmitted through an outside line.

Other objects and advantages of the invention will be apparent from the following description taken in connection with the accompanying drawings, in which:

BRIEF DESCRIPTION OF THE DRAWINGS

FIGS. 2A and 2B are circuit diagrams of a key telephone and a key service unit in the key telephone system shown in FIG. 1;

DESCRIPTION OF THE PREFERRED EMBODIMENTS

The principle of the operation of an embodiment of a key telephone system of the invention will be given with reference to FIG. 1.

Figure 1:
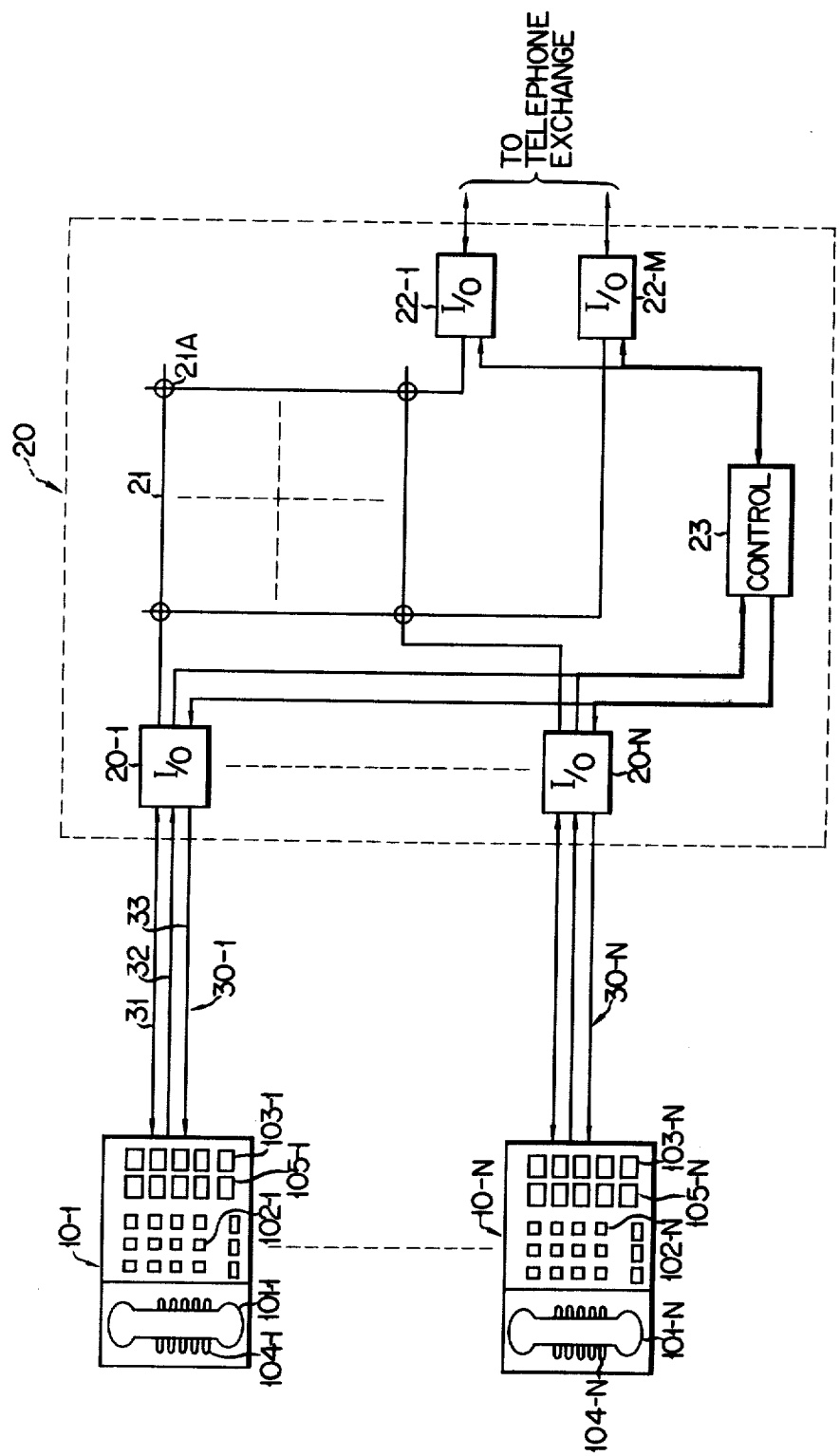
FIG. 1 illustrates an entirety of a key telephone system according to an embodiment of the invention.

A key telephone system shown in FIG. 1 comprises N key telephones 10-1 to 10-N, a key service unit 20, N transmission paths 30-1 to 30-N each including transmission cables 31 to 33.

Each of the key telephones 10-1 to 10-N includes a handest 101, a touch tone type multi-frequency dial key switch 102, a local display lamp 103, a loudspeaker section 104 and a line selection key 105. The key service unit 20 includes input/output terminal devices 20-1 to 20-N connected through the transmission paths 30-1 to 30-N to the respective key telephones 10-1 to 10-N, a cross-point module 21 having crosspoints arranged in a matrix array and row lines connected to the I/O terminal devices 20-1 to 20-N, I/O terminal devices 22-1 to 22-N connected to the column lines of the crosspoint module 21, and a control circuit 23 connected between the I/O terminal devices 20-1 to 20-N and the I/O terminal devices 22-1 to 22-N. The I/O terminal devices 22-1 to 22-N are connected to a telephone exchange of a telephone office.

When placing a phone call by using, for example, a key telephone 10-1 in the key telephone system, a subscriber takes the handset 101-1 from the hook and presses a key switch 105-1 for specifying the outside line to be used. An upcontrol signal corresponding to the operation of the key switch 105-1 is supplied to the control circuit 23 through the transmission cable 32 and the I/O terminal device 20-1. The control circuit 23 selectively energizes the crosspoint of the crosspoint module 21, e.g. a crosspoint 21A, and an I/O terminal device, for example, the I/O terminal device 22-1 connected to the outside line selected. Thus, the handset 101 of the key telephone 10-1 is connected to the telephone exchange of an telephone office through the transmission cable 31 and the I/O terminal device 22-1. Then, the subscriber operates the switches 102-1 to dial the desired phone number for making a conversation or communication path between the calling and called subscribers.

The details of the key telephone system shown in FIG. 1 will be given with reference to FIGS. 2A and 2B.

Transmitting and receiving circuit sections (not shown) of the key telephone 10-1 are coupled with a resistive hybrid circuit 114 through amplifiers 110 and 112, respectively. The hybrid circuit 114 is connected to the primary side of a transformer 116 of which the secondary side is connected to the transmission cable 31. The hybrid circuit may be of a conventional type and is constructed by a resistive circuitry. The hybrid circuit prevents an interference between a signal transmitted from the amplifier 110 to the transformer 116 and another signal from the transformer 116 to the amplifier 112. The dial key switch 102 is coupled with the transmission cable of the handset 101. The line selection key switches 105 are connected to a parallel to series converter 118. The output line of the parallel to series converter 118 is connected to a control information signal generating circuit 120.

The up-control information signal generating circuit 120 includes AND gate 122 and 124 whose first input terminals are connected to an output terminal of the P/S converter 118. The output terminals of the AND gates 122 and 124 are connected to a capacitor C1 through buffer 126 and inverter 128, and resistors R1 and R2, respectively. The capacitor C1 is also connected at the other end to the primary side of a transformer 130 whose secondary side is connected to the transmission cable 32.

The indicator lamps or light emission diodes 103 are connected to a series-parallel converter 132 connected to the output terminal of a down-control information signal receiving circuit 140. The signal receiving circuit 140 is connected at the input terminal to a primary side of a transformer 134 connected at the secondary side to the transmission cable 33.

The signal receiving circuit 140 is provided with three level detectors 142 to 144 which are connected commonly to the secondary side of the transformer 134 through an amplifier 141. The output terminals of the level detectors 143 and 144 are connected to the second input terminals of the AND gates 122 and 124, respectively. The output terminal of the level detector 143 is connected to the input terminal of a level detector 146 through an inverter 145, and a parallel circuit including a diode D1 and a resistor R3. The input terminal of the level detector 146 is grounded through a capacitor C2. The output signal of a level detector 146 controls the operations of the P/S and S/P converters 118 and 132, in cooperation with the output signal of the level detector 143.

A loudspeaker section 104 is connected through an amplifier circuit 150 to a transformer 152 whose secondary winding is connected between the center taps or neutral points of the secondary windings, of the transformers 116 and 130.

A constant voltage power supply 154 renders constant a voltage supplied from the neutral point of the secondary windings of the transformers 130 and 134 and supplies a drive voltage to the circuits 110, 112, 118 and 132 of the key telephone 10-1.

Figure 2B:
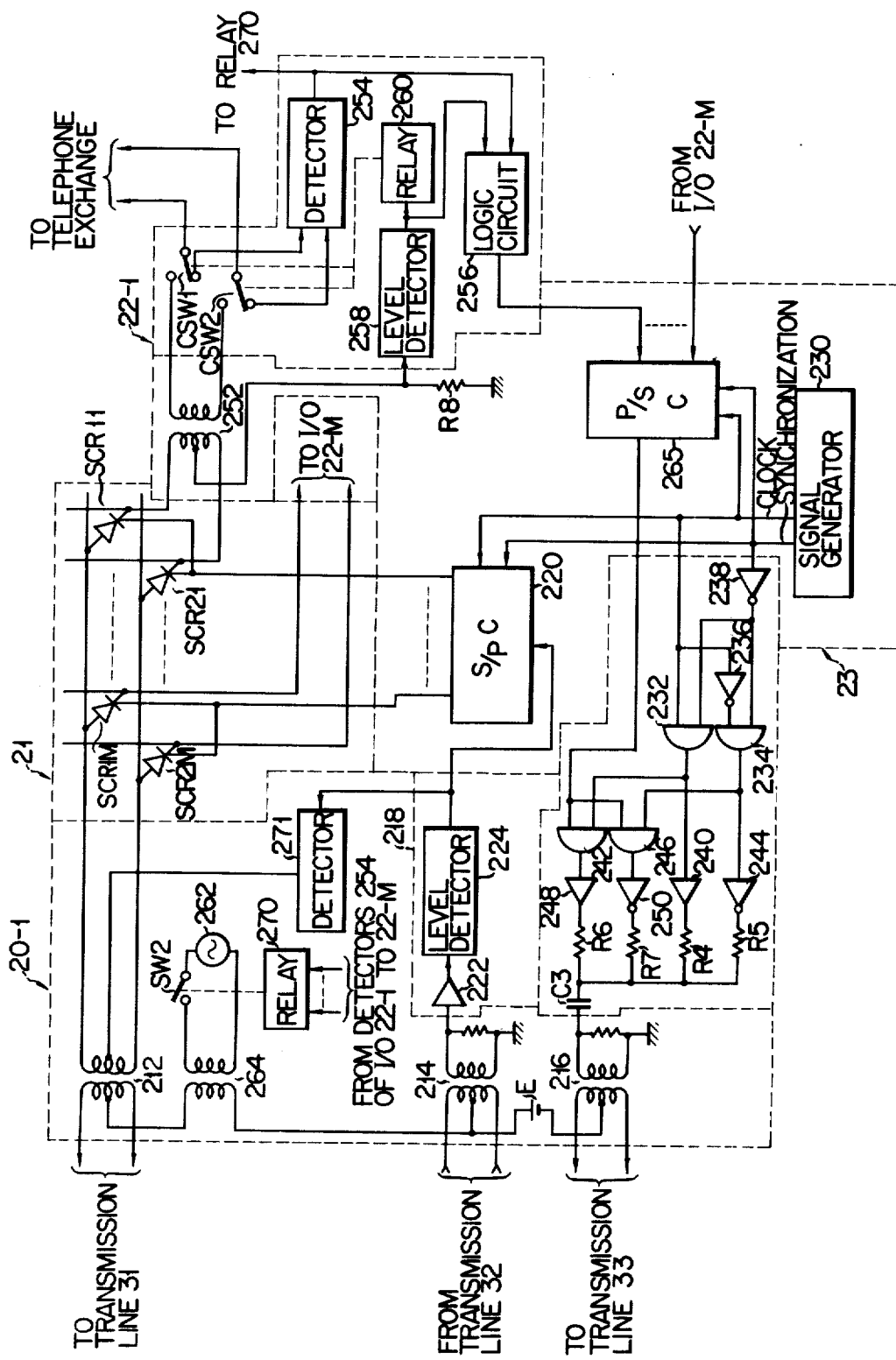

The I/O terminal device 20-1 of the key service unit 20 shown in FIG. 2B is provided with transformers 212, 214 and 216 connected at the input terminals to the transmission cables 31, 32 and 33, respectively. The secondary side of the transformer 212 is connected to a corresponding row line of the crosspoint module 21. The transformer 214 is connected at the secondary side to the series-parallel converter 220 of the control circuit 23 through the up-control information signal receiving circuit 218. The output terminals of the S/P converter 220 are connected to the control terminals of the crosspoints of the crosspoint module 21. The signal receiving circuit 218 is provided with an amplifier 222 with an input terminal connected to the secondary side of the transformer 214 and a level detector 224 connected at the input terminal to the output terminal of the amplifier 222. The secondary winding of a transformer 216 is connected through an up-control information signal generating circuit 228 to a parallel-series converter 226 of the control circuit 23. The up-control information signal generating circuit 228 is provided with an AND gate 232 and an AND gate 234 receiving a clock signal via an inverter 236. The AND gate 232 receives a clock signal generated from a signal generating circuit 230. These AND gates 232 and 234 receive at the other input terminals a synchronizing signal from the signal generating circuit 230. The output terminal of the AND gate 232 is connected to a capacitor C3 via a buffer 240 and a resistor R4 and to one input terminal of an AND gate 242. The output terminal of the AND gate 234 is connected to one input terminal of an AND gate 246 and to the capacitor C3 through an inverter 244 and a resistor R5. The other input terminals of the AND gates 242 and 246 are commonly connected to the output terminal of the P/S converter 226. The output terminal of the AND gate 242 is connected to the capacitor C3 through a buffer 248 and a resistor R6. The output terminal of the AND gate 246 is connected to the capacitor C3 through an inverter 250 and a resistor R7.

The crosspoints module 21 has a plurality of crosspoints each formed of paired semiconductor switches such as thyristors SCR11, SCR21, . . . SCR1M, SCR2M, and selectively couples the key telephone 10-1 with one of the outside lines through a corresponding one of the crosspoints. Although not shown for simplicity, other key telephones 10-2 to 10-N are each provided with a similar arrangement and similar semiconductor switches are provided in the crosspoint module 21 for each key telephone.

The thyristors SCR11 and SCR21 are connected at one end to the secondary side of the transformer 212 and at the other end to the primary side of the transformer 252. The center taps of the primary winding of the transformer 252 is grounded through a resistor R8. The secondary winding of the transformer 252 is connected to first movable contacts of channel switches CSW1 and CSW2 which are each constructed by a two-position switch and whose fixed contacts are coupled with the telephone exchange through an outside line. The second movable contacts of the channel switches CSW1 and CSW2 are connected to an incoming call signal detector 254 which is responsive to an incoming call signal from the telephone exchange to produce an output signal toward a logic circuit 256. Another input terminal of the logic circuit 256 is connected to the output terminal of a level detector 258 coupled at the input terminal with the center tap of the primary winding of the transformer 252. The output terminal of the logic circuit 256 is connected to one input terminal of the P/S converter 226. The output terminal of the level detector 258 is coupled with a relay circuit 260. When energized by an output signal from the level detector 258, the relay circuit 260 sets the channel switches CSW1 and CSW2 to the first movable contacts.

To the input terminals of the P/S converter 226 are connected output terminals of the I/O terminal devices 22-1 to 22-N which are constructed similarly. A power source E for energizing the key telephone is coupled between the center taps of the primary windings of the transformers 214 and 216 and energizes the power supply 154 through the center taps of the primary windings of the transformers 214 and 216 and the center taps of the secondary windings of the transformers 130 and 134, causing the power supply 154 to supply a constant voltage to the circuits of the key telephone. An oscillator 262 for driving the loudspeaker 104 is connected via a switch SW2 to the primary winding of a transformer 264 whose secondary winding is connected between the center taps of the primary windings of the transformers 212 and 214. The switch SW2 is controlled by an output signal of a relay circuit 270 operable in response to a signal from the signal detectors 254 of the I/O terminal devices 22-1 to 22-M. When a hook pulse detector 271 detects a hook pulse included in the output signal from the level detector 224 and showing that the handset is picked up, an output signal is supplied from the hook pulse detector 271 to the thyristors SCR11 to SCR2M through the center tap of the secondary winding of the transformer 212.

For clarity, only one up-control signal receiving circuit 218 and only one down-control signal generating circuit 228 are shown in FIG. 2B. However, it should be noted that when a plurality of key telephones 10 are used, a corresponding number of circuits 218 and 228 are used. In this case, the output signals of the level detectors 224 may be supplied to the S/P converter 220 through an OR gate (not shown) and the output signal of the P/S converter 226 is supplied to respective down-control signal generating circuits 228.

Figure 3:
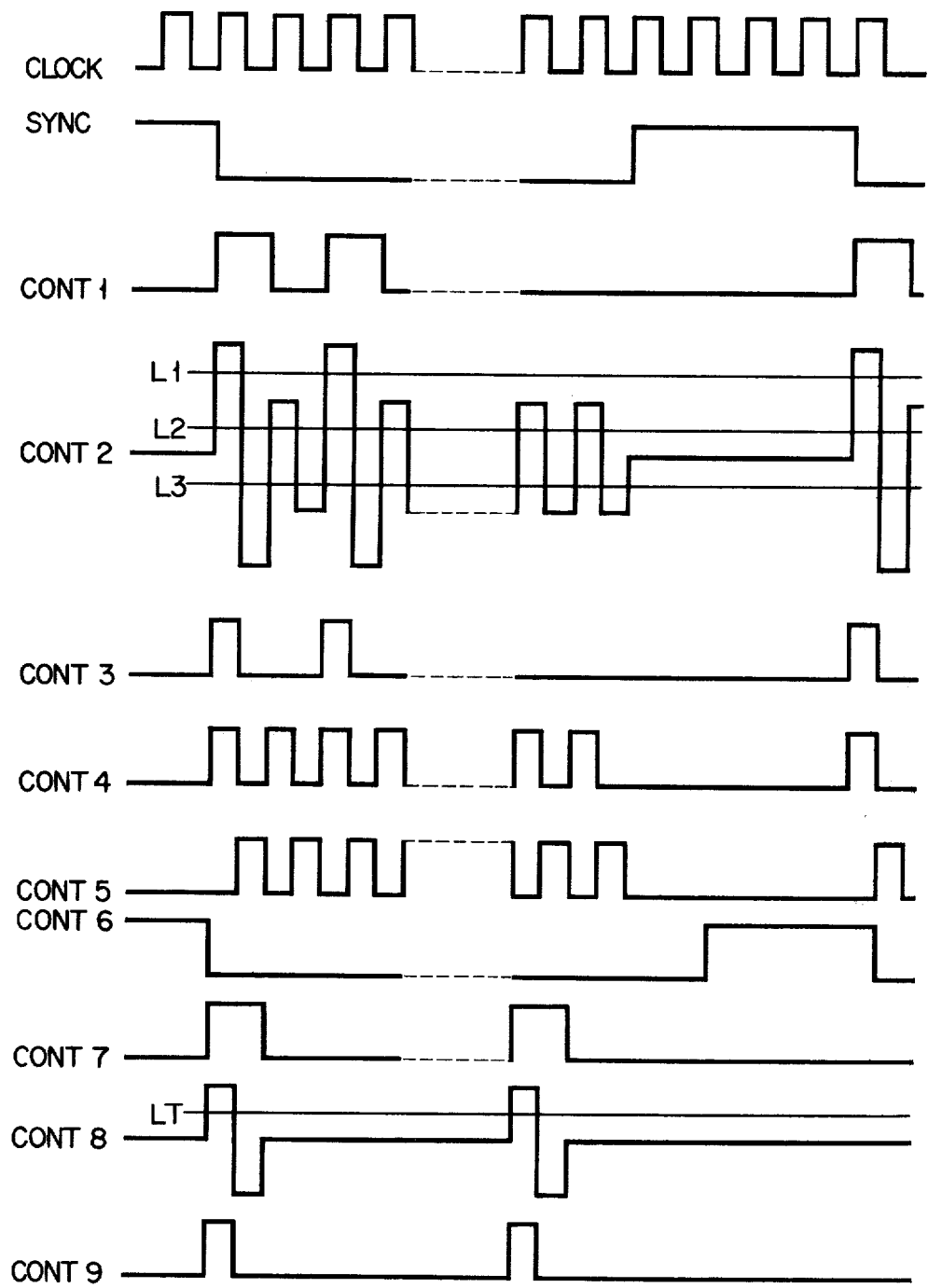
FIG. 3 shows signal waveforms used for explaining the operations of the key telephone and the key service unit in FIGS. 2A and 2B.

The operation of the circuits shown in FIGS. 2A and 2B will be described with reference to FIG. 3 illustrating waveforms in some circuit points in FIGS. 2A and 2B.

The signal generating circuit 230 in FIG. 2B supplies a clock signal "CLOCK" and a synchronizing signal "SYNC" as shown in FIG. 3 to the up-control information signal generating circuit 228. In the embodiment, a clock pulse signal of 2.4 KHz is used for the "CLOCK" signal and one period of the "SYNC" signal is set equal to 32 pulses of the "CLOCK" signal and the high and low level durations of the "SYNC" signal are so set as to correspond to 28 and 4 pulses of the "CLOCK" signal, respectively.

Let us consider a case where a an incoming call signal is transmitted from the telephone exchange in a telephone office through first and third outside lines. The call tone signal transmitted through the first outside line, for example, is fed to the signal detector 254 via the channel switches CSW1 and CSW2 set at the second movable contact side. In response to this, the detector 254 energizes the relay circuit 270 to close the switch SW2 and to drive the loudspeaker 104 and at the same time to produce an output signal to the P/S converter 226 through the logic circuit 256. Similarly, a signal indicating that the third outside line is used is fed from another I/O terminal device (not shown) to the P/S converter 226. The P/S converter 226 multiplexes the input signals in time-sharing fashion to produce a control signal "CONT 1" to each down-control information signal generating circuit 228. Upon receipt of the "CLOCK" signal, "SYNC" signal and "CONT 1" signal, the down-control information signal generating circuit 228 logically processes these signals by using AND gates 232, 234, 242 and 246. The output signals of these AND gates are respectively applied through buffer 240, inverter 244, buffer 248 and inverter 250 to the resistors R4 to R7 where these output signals are summed. The summed signal is applied as a down-control information signal "CONT 2" to the transmission cable 33 through the transformer 216.

The "CONT 2" signal is applied to the down-control information signal receiving circuit 140 through the transformer 134 shown in FIG. 2A. When detecting level L1 of the "CONT 2" signal, the level detector 142 in the receiving circuit 140 supplies a control pulse "CONT 3" to the S/P converter 132. When detecting the level L2 of the "CONT 2", the level detector 143 supplies a control pulse "CONT 4" to the first drive control terminal of the S/P converter 132 and to the AND gate 122 of the up-control information signal generating circuit 120. When detecting level L3 of the "CONT 2" signal, the level detector 144 supplies a control pulse "CONT 5" to the AND gate 124 of the up-control information signal generating circuit 120.

The output pulse of the level detector 143 charges a capacitor C2 through the inverter 145 and the resistor R3. The level detector 146 detects the charging level of the capacitor C2. When the charging level exceeds a predetermined level, i.e. when the level detector 143 continuously supplies a control pulse, the level detector 146 produces an output signal of low level. When it falls below the predetermined value, i.e. when the level detector 143 stops generating a control pulse, the level detector produces a high level signal with a predetermined time delay. Then, a control signal "CONT 6" shown in FIG. 3 corresponding to the synchronizing signal "SYNC" is supplied to the second drive control terminal of the S.P converter 132.

In this manner, depending on the control signals from the level detectors 143 and 146, the S/P converter 132 converts the "CONT 3" signal from the level detector 142 into parallel output signals which in turn drive light emission diodes 103 corresponding to the first and third outside lines, thereby to indicate use of these outside lines.

Seeing the lighted light emission diodes 103, a called subscriber takes the handset from the hook and presses the line selection key switch 105 corresponding to the first outside line, for example. Then, like a case where a phone call is made from the key telephone 10-1 as will be described later, the corresponding paired semiconductor switches in the crosspoint module 21 are energized to set the channel switches CSW1 and CSW2 at the first movable contact side. As a result, a message channel is completed between the key telephone and the first outside line.

When making a phone call from the key telephone side, a subscriber first takes the handset 101 from the hook, and presses the line selection key switch 105 to select an outside line cable to be used. When the handset 101 is taken from the hook, the switch SW1 of the switch 105 is closed and an energizing signal is supplied to the amplifiers 110 and 112. When the line selection key switch 105 is depressed, the parallel signals corresponding to the switch depression are applied to the P/S converter 118. The P/S converter 118 multiplexes the parallel input signals into a series signal in a time-sharing fashion. The series signal is applied to the AND gates 122 and 124 in the form of a control signal CONT 7" indicating that the handset 101 is taken from the hook and that the first outside line, for example, is selected. As described above, these AND gates 122 and 124 receive at the other input terminal the control signals "CONT 4" and "CONT 5" from the down-control information signal receiving circuit 140. The output signals of the AND gates 122 and 124 are fed to the resistors R1 and R2 through the buffer 126 and the inverter 128, respectively. These output signals are summed thrugh these resistors and are then supplied through the capacitor C1 and the transformer 130 to the transmission line 32 as an up-control information signal "CONT 8".

The up-control information signal "CONT 8" is supplied to the level detector 224 through the transformer 214 and the amplifier 222. The level detector 224 detects an input signal of, for example, a level LT, and supplies a control signal "CONT 9" to the S/P converter 220. The S/P converter 220 converts the "CONT 9" into parallel signals which then turn on the crosspoints, e.g. the thyristors SCR11 and SCR21 in this example, corresponding to the line selection key switch 105 pressed. The output current of the hook signal detector 271 flows to ground through the center tap of the secondary winding of the transformer 212, thyristors SCR11 and SCR21 turned on, the center tap of the primary winding of the transformer 252 and the resistor R8. At this time, the voltage drop produced across the resistor R8 is detected by the level detector 258 by which the relay circuit 260 is energized. The relay circuit 260 energized sets the channel switches CSW1 and CSW2 from the second movable contact side to the first movable contact side. In this manner, the key telephone 10-1 is connected to the first outside line. Under this condition, the dial key switch 102 is pressed to specify the telephone number of the called subscriber, with the result that a talking or communication path between calling and called subscribers is established. In this case, the output signal of the level detector 258 is supplied to the P/S converter 226 through the logic circuit 256 so that the line displaying LED 103 for the first outside line is lighted through the above-mentioned path.

Under this talking state of the key telephone 10-1, when the telephone exchange in a telephone office sends an incoming call signal through an outside line other than that currently used, the output signal from the P/S converter 226 is supplied to the S/P converter 132, through the down-control information signal receiving circuit 228, the transformer 134 and the down-control information signal receiving circuit 140. The output signal of the S/P converter 132 energizes the amplifier 150. An incoming call signal detector 254 of another I/O terminal device having received the incoming call signal energizes the relay 270 to close the switch SW2. This drives the loudspeaker 104 through the center taps of the transformers 212 and 214, the transformer 152 and the amplifier 150, to produce a paging sound.

Figure 4A:
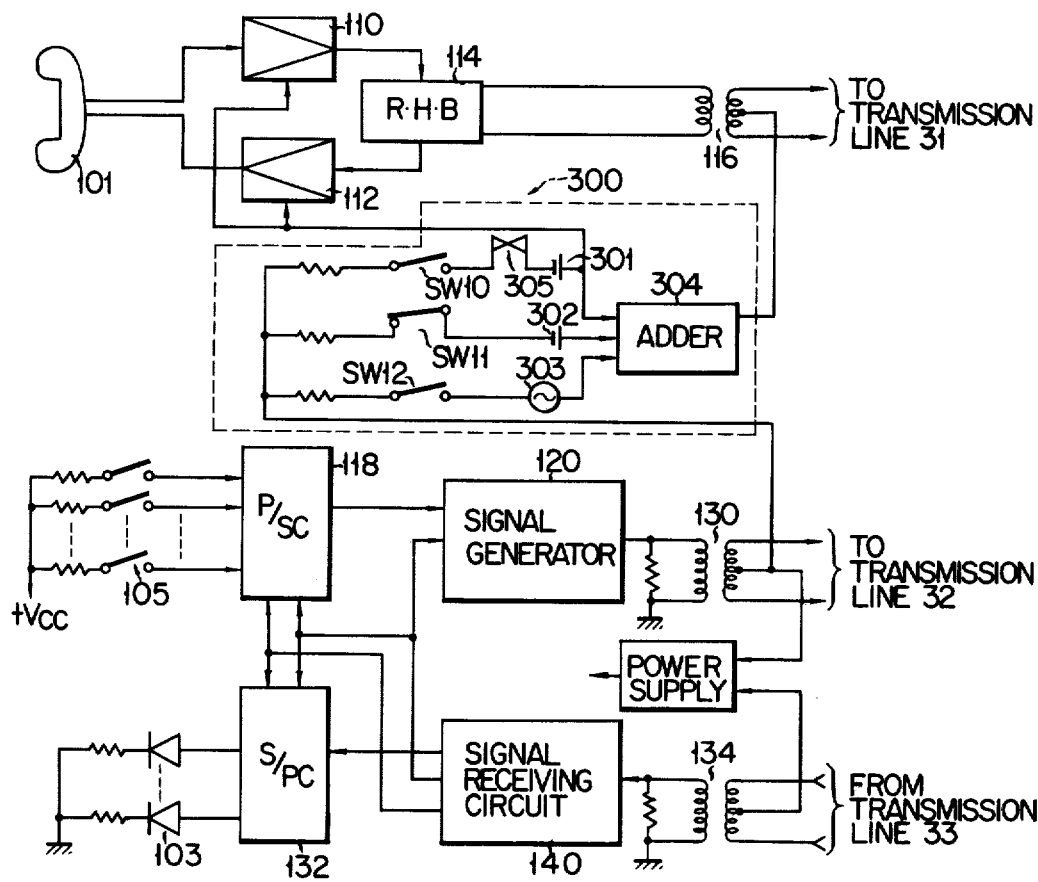
FIGS. 4A and 4B show the key telephone and key service unit of a key telephone system according to another embodiment of this invention.

Another embodiment of the key telephone system of the invention will be given in connection with FIGS. 4A and 4B.

This embodiment is substantially equal to the embodiment in FIGS. 2A and 2B except that a switching signal generating circuit 300 is used instead of the dial key switch 102 and a switching signal processing circuit 310 is used instead of the detector 271. Like portions in the FIG. 2 embodiment will be designated by the same reference numerals in this embodiment and the details of them will be omitted. The switching signal generating circuit 300 includes a hook switch SW10 which is turned on when a handset 101 is picked up, a dial key switch SW11, a hold key switch SW12, DC power sources 301 and 302 and an oscillator 303, and an adder circuit 304 coupled with the power sources 301, 302 and the oscillator 303. The dial key switch SW11 is used instead of the touch tone type dial key switch 102 in FIG. 2A.

The switching signal processing circuit 310 includes a resistor R10 connected to the center taps of the primary windings of the transformers 212 and 214, level detectors 311 and 312 of which the input terminals are connected to the junction between the resistor R10 and the center tap of the primary winding of the transformer 212, an adder circuit 313 connected through a buffer 314 to the junction, and a DC power source 315 and an oscillator 316 connected between the level detectors 311 and 312, and the adder circuit 313.

The voltage drop across a resistor R8 is applied to a level detector 258, a level detector 334 through a filter 330 and a diode 332, and a level detector 340 through a filter 336 and a diode 338. When receiving an input signal exceeding a predetermined level, the level detector 334 energizes the relay circuit 342 and closes the hook switch SW13. In response to an input signal above a predetermined level, the level detector 340 sets flip-flop circuit 344. The reset terminal R of the flip-flop circuit 334 is coupled with the level detector 258 and the output terminal Q thereof is connected to the relay circuit 260 via an OR gate 346 and to a logic circuit 245. The output terminal of the level detector 258 is supplied to the relay 260 via an OR gate 346.

For a key telephone oriented call, the telephone handset 101 is picked up and a selection key 105 for a desired outside line is pressed. Upon taking the telephone handset, the hook switch SW10 is closed so that current flows from the power source 301 into the resistor R10, via adding circuit 304, the center taps of the secondary windings of the transformers 116 and 130, and the center tap of the primary winding of the transformers 212 and 214. As a result, the level detector 311 detects a level L4 (FIG. 5A) to energize the power source 315 which in turn supplies a DC voltage to the anodes of the thyristors SCR11 to SCR1M and SCR21 to SCR2M via the adding circuit 313 and the center tap of the secondary winding of the transformer 212. As described above, the actuation of the key switch 105 causes the control circuit 23 to produce the corresponding control signal to the gates of the selected paired SCR's, for example, thyristors SCR11 and SCR21. Upon receipt of the control signal, these SCR's are rendered conductive to permit current to flow through the SCR's, the center tap of the primary winding of the transformer 252, and the resistor R8. The voltage drop across the resistor R8 causes the level detector 258 to energize the relay circuit 260 through the OR gate 346 and to set the channel switches CSW1 and CSW2 to the first movable contact. In this way, a message path is completed between the key telephone and the outside line.

Then, the dial key switch SW11 is operated to specify the telephone number of the subscriber to be called. A case of specifying dial "3" will be described for simplicity. In this case, the dial key switch SW11 is turned on and off three times to produce three pulses superimposed on a voltage signal from the power source 301. The pulse signal is supplied to the resistor R10 via the center taps of the primary windings of the transformers 116 and 130 and the center taps of the primary windings of the transformers 212 and 214. In this case, the level detector 312 detects a level L5 of the voltage drop across the resistor R10 to produce an output signal which in turn energizes the oscillator 316. The output signal of the oscillator 316 is superposed on the power supply 315 as shown in FIG. 5B and transmitted through the center tap of the secondary winding of the transformer 252 and the resistor R8. The AC signal is fed to the level detector 334 via the filter 330 and the diode 332. As a result, the level detector 334 energizes the relay circuit 342 over a period corresponding to the AC signal existing period. Accordingly, the dial switch SW13 is turned on and off in response to the AC signal. In this manner, the dial signal corresponding to the actuation of the dial key switch SW11 is transferred to a telephone exchange through a desired outside line.

Figure 5A:
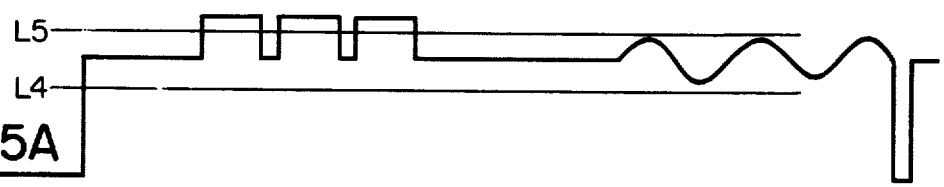
FIGS. 5A and 5B show signal waveforms for illustrating the operations of the circuit diagrams shown in FIGS. 4A and 4B.
Figure 5B:
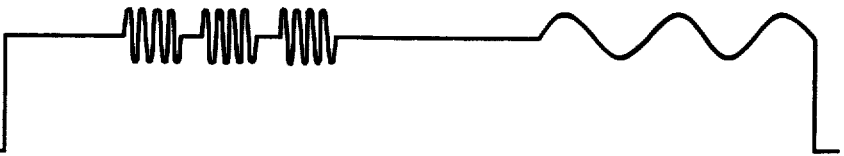

When the hold key switch SW12 is closed, the AC signal from the oscillator 303 is superposed in a DC signal from the DC power source 301 as shown in FIG. 5A, and transferred to ground via the transmission cables 31 and 32 and the resistor R10. The voltage drop across the resistor R10 is supplied to the adding circuit 313 via the buffer 314. In the adding circuit, it is superposed on the DC signal from DC power source 315 and transferred to the resistor R8 through the center tap of the secondary winding of the transformer 212, thyristors SCR11 and SCR21, and the center tap of the primary winding of the transformer 252. The AC component is supplied to the level detector 340 via the filter 336 and the diode 338. Then, the level detector 340 produces an output signal to set the flip-flop circuit 344. The output signal of the flip-flop circuit 344 is fed through the OR gate 346 to the relay circuit 260 to hold the channel switches CSW1 and CSW2 at the first movable contact position, and keep the message path in active condition.

When the hold key switch SW12 is opened, a snap switch 305 connected in series with the power source 301 and interlocked with the hold key switch SW12 is temporarily turned off. This produces an on-hook signal at the end of the hold signal as shown in FIG. 5A. The on-hook signal ceases the current flowing through the resistor R10 to block application of a DC bias from the power supply 315 to the anodes of the thyristor SCR11 and the SCR21. As a result, the thyristors SCR11 and SCR21 are non-conductive. Afterward, actuation of the line selection key 105 keeps the message path between the crosspoint module 210 and the exchange in the office in active condition while a message channel can be set up between this key telephone and the other outside line.

Figure 6:
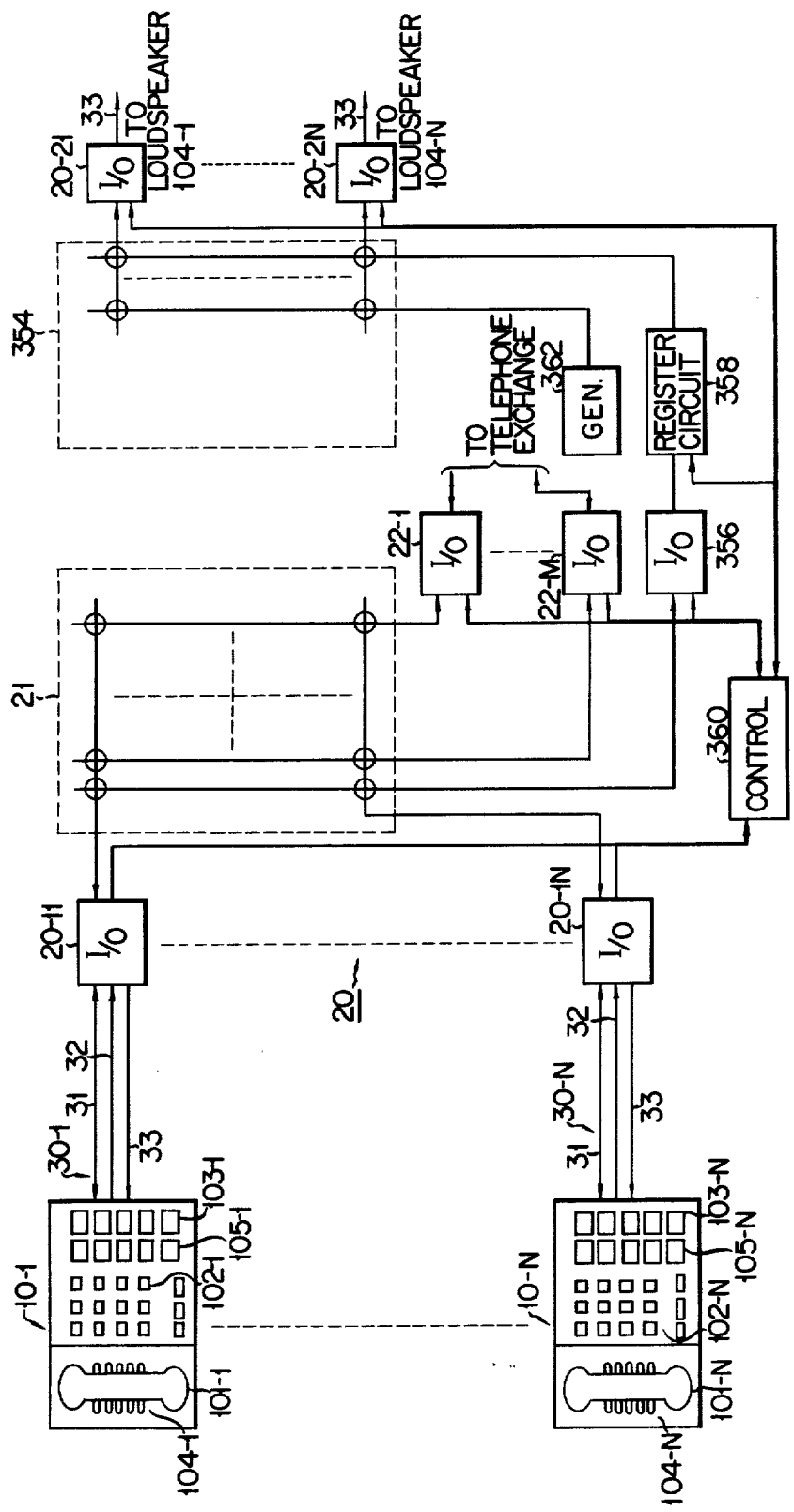
FIG. 6 illustrates an entirety of a key telephone system according to another embodiment of this invention.

FIG. 6 shows a key telephone system of another embodiment of the invention. The key telephone system of this example is substantially equal to that of FIG. 1 except that a cross-point section 354 for voice paging which is formed of a plurality of switches SW2 one of which is shown in FIG. 2B. The I/O terminal devices 20-1 to 20-N in FIG. 1 are constituted by I/O terminal devices 20-11 and 20-21, . . . and 20-1N and 20-2N. The FIG. 6 example is further provided with an intercom I/O terminal device 356 and an intercom call circuit 358 for permitting an intercom talking.

When a phone call is made by using the key telephone 10-1 in the key telephone system, the phone handset 101-1 is first taken from the hook and the line selection key switch 105-1 is actuated. As in the previous case, the control circuit 360 responds to a line specifying signal generated by the actuation of the line selection key swtich 105-1 to produce a control signal toward the message crosspoint module 21. The control signal energizes the crosspoints selected to complete a message path between the key telephone 10-1 and one of the outside line I/O terminal devices 22-1 to 22-M.

When an incoming call signal is fed from an telephone office to the key telephone system, the control circuit 360 lights a line displaying lamp 103 corresponding to the outside line through which the incoming call signal is fed. At the same time, the control circuit 360 energizes the calling signal generator 362 to drive the loudspeakers 104 of the key telephones through the calling crosspoint section 354. Responding to the paging of the loudspeakers, a subscriber takes a handset 101-1 of the key telephone 10-1, for example, and actuates the outside line selection key 105-1 corresponding to the lighted lamp. Consequently, a message path is formed between the key telephone 10-1 and the outside line through which the calling signal is transmitted, via the message crosspoint module 21, as in the previous case.

When an intercom talking is desired, for example, when a phone call is made from the key telephone 10-1 to the key telephone 10-N, a calling party takes the handset 101-1 and actuates a key switch for indicating an intercom talking in the line selection key switches 105-1. Then, a calling signal is transmitted to the control circuit 360 through the I/O terminal device 20-11. Upon receipt of the calling signal, the control circuit 360 produces a control signal to the crosspoint module 21 to energize corresponding crosspoints so that the I/O terminal devices 20-11 and 356 are connected. As a result, the calling signal goes through the I/O terminal device 20-11, the crosspoint module 21 and the I/O terminal device 356 to the intercom calling circuit 358. Under this condition, the dial switch 102 is actuated to specify the intercom dial number of the called party. This actuation produces an intercom dial number specifying signal which in turn goes through the I/O terminal device 20-11 to the control circuit 360. The control circuit 360 responds to the intercom dial number specifying signal to energize the corresponding crosspoints in the crosspoint section 354, thereby to connect the intercom calling circuit 358 with, for example, the I/O terminal device 20-2N. In this manner, the calling party makes a voice paging through the handset 101-1, with the result that the voice paging signal is supplied to the loudspeaker 104-N of the key telephone 10-N, through I/O terminal device 20-11, the crosspoint module 21, the I/O terminal device 356, the intercom calling circuit 358, the crosspoint section 354, and the I/O terminal device 20-2N. Then, the called party takes the handset 101-N and actuates the key switch 105-N for specifying an intercom line to energize the corresponding crosspoints in the crosspoint module 21. The energization of the crosspoints completes an intercom path between the key telephones 10-1 and 10-N through the I/O terminal device 20-11, the crosspoint module 21, and the I/O terminal device 20-1N.

It is to be noted here that, also in this embodiment, when an incoming call signal is produced from the telephone exchange in the telephone office or one of the internal key telephones, a voice paging can be effected through the loudspeaker irrespective of the talking condition.

Figure 7A:
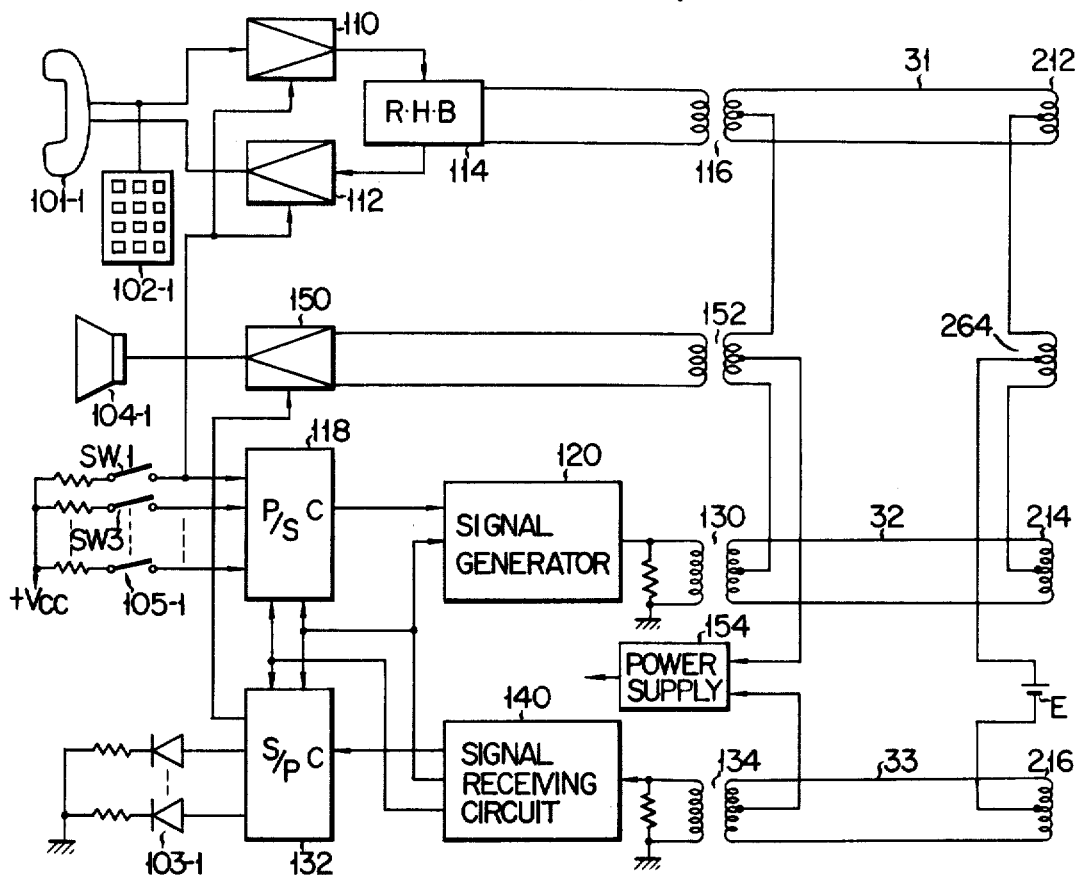
FIGS. 7A and 7B show a circuit diagram showing a wiring relation among a key telephone, three transmission cable, and a key service unit of the key telephone system shown in FIG. 6.

FIG. 7A shows a circuit diagram of the key telephone 10-1 and part of the I/O terminal device 20-11. The circuit of FIG. 7A is similar to that of FIG. 2A except that a holding switch SW3 is additionally used in the line selection key switch 105-1, the power supply 154 is inserted between the center taps of the secondary windings of the transformers 134 and 152, and the DC power source E is inserted between the center taps of the secondary windings of the transformers 216 and 264.

Figure 7B:
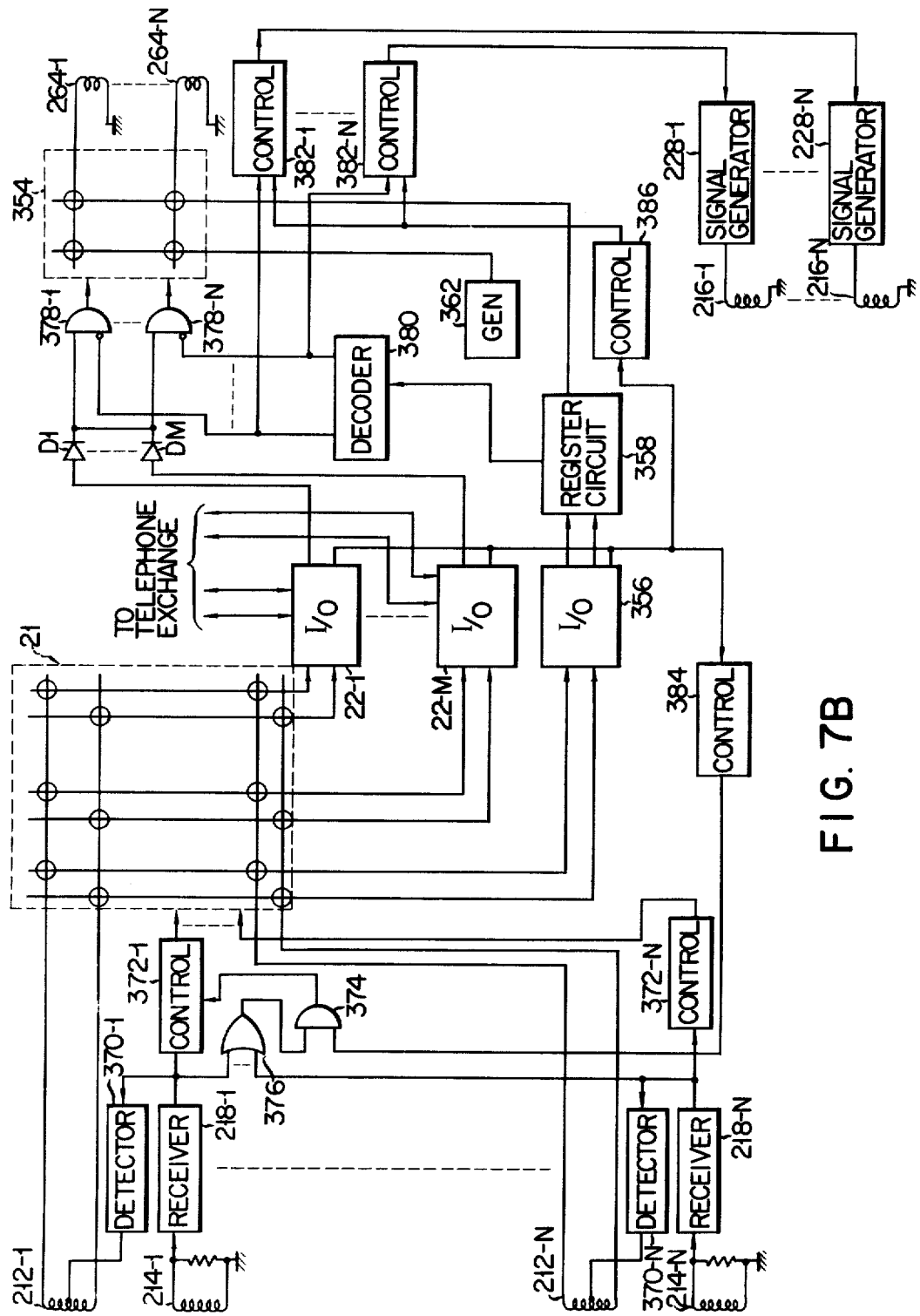

FIG. 7B shows the remaining part of the circuit of FIG. 7. In the figure, the circuit illustrated is for a plurality of key telephones; for simplicity, however, the description to follow relates to only the circuitry for a single key telephone 10-1.

As shown, the secondary winding of the transformer 214-1 is coupled with the up-control information signal receiving circuit 218-1. The receiving circuit 218-1 is coupled with the center tap of the secondary winding of the transformer 212-1 through a switch signal detection circuit 370-1 to be described later and a control circuit 372-1 for selecting column lines of the crosspoint module 21. As will subsequently be described, the control circuit 372-1 is controlled by the AND gates 374 receiving output signals of the receiving circuits 218-1 to 218-N via an OR gate 376.

I/O terminal devices 22-1 to 22-M are commonly connected through diodes D1 to DM and then are connected to AND gates 378-1 to 378-N, respectively. These AND gates are connected at the other input terminal to N output terminals of a decoder 380 for decoding the output signal from an intercom calling circuit 358, and at the output terminals to the control terminals of the crosspoints of the crosspoint section 354 for selecting row lines of the same. The row lines of the crosspoint section are coupled with the secondary windings of the transformers 264-1 to 264-N, respectively. The N output lines of the decoder 380 are connected to the secondary windings of the transformers 216-1 to 216-N via the control circuits 382-1 to 382-N and signal generators 228-1 to 228-N, respectively. Output terminals of the I/O terminal devices 22-1 to 22-M are connected commonly to the input terminal of a control circuit 384 whose output terminal is connected to the other input terminal of the AND gate 374, and to a control circuit 386 for producing a lighting control signal to the control circuits 382-1 to 382-N. The output terminals of the control circuits 382-1 to 382-N are connected to the secondary windings of the transformers 216-1 to 216-N, through signal generators 228-1 to 228-N which are each constructed like the down-control signal generating circuit 228 in FIG. 2B.

The control circuit 360 in FIG. 6 includes the control circuits 372, 382, 384 and 386, detector 370, AND gates 374 and 378, decoder 380, P/S converter 226, and signal generators 228-1 to 228-N in FIG. 7B to effect various functions in addition to the function of control circuit 23 in FIG. 2B. Further, the control circuit 360 includes the signal generator 30 in FIG. 2B and provides an outside line selection signal, an intercom line selection signal, a special function spefifying signal, and 32 timing signals T1 to T32 of 2.4 KHz, for example, used as a synchronizing signal. The timing signals T1 to T32 are used as tabulated in Table 1, for example.

| Timing Pulses | Allotment | Down-control Signal | Up-Control Signal |
| --- | --- | --- | --- |
| T1 | 1st outside line designation | 1st outside line indication lamp | 1st outside line designation key |
| T2 | 2nd outside line designation | 2nd outside line indication lamp | 2nd outside line designation key |
| . | . | . | . |
| . | . | . | . |
| T19 | 19th outside line designation | 19th outside line indication lamp | 19th outside line designation key |
| T20 | 20th outside line designation | 20th outside line indication lamp | 20th outside line designation key |

-continued

| Timing Pulses | Allotment | Down-control Signal | Up-Control Signal |
|---|---|---|---|
| T21 | 1st intercom line designation | 1st intercom line indication lamp | 1st intercom line designation key |
| . | . | . | . |
| . | . | . | . |
| . | . | . | . |
| T24 | 4th intercom line designation | 4th intercom line indication lamp | 4th intercom line designation key |
| T25 | For special purpose | Amplifier energization | Hook switch |
| T26 | Same as above | Bidirectional Calling | Holding switch |
| T27 | Same as above | None | Common key |
| T28 | Same as above | None | None |
| T29 | | Synchronization | |
| . | | . | |
| . | | . | |
| T32 | | Synchronization | |

The function of the key telephone system will be briefly described with reference to Table 1.

For example, when the phone handset 101-1 of the key telephone 10-1 is taken from the hook, the hook switch is closed and a signal including a hook pulse corresponding to the timing pulse T25 is applied to the key service unit 20. Then, the line selection key switch 105-1 is actuated for selecting the first outside line, so that a signal including a first outside line specifying pulse corresponding to the timing pulse T1 is applied to the key service unit 20, together with the hook pulse. In response to the signal, the key service unit 20 connects the key telephone 10-1 with the first outside line.

In the intercom talking from the telephone 10-1, the telephone handset 101-1 of the telephone 10-1 is picked up and the line selection key switch 105-1 is operated to specify, for example, the first intercom line. A signal including the hook pulse and the first intercom line specifying pulse corresponding to the timing pulse T21 is processed in the key service unit 20, with the result that a ready for intercom talking state is set up between the key telephone 10-1 and the selected key telephone.

The key telephone system shown in FIGS. 6 and 7 will be described more in detail with reference to FIGS. 8 to 16.

Figure 8:
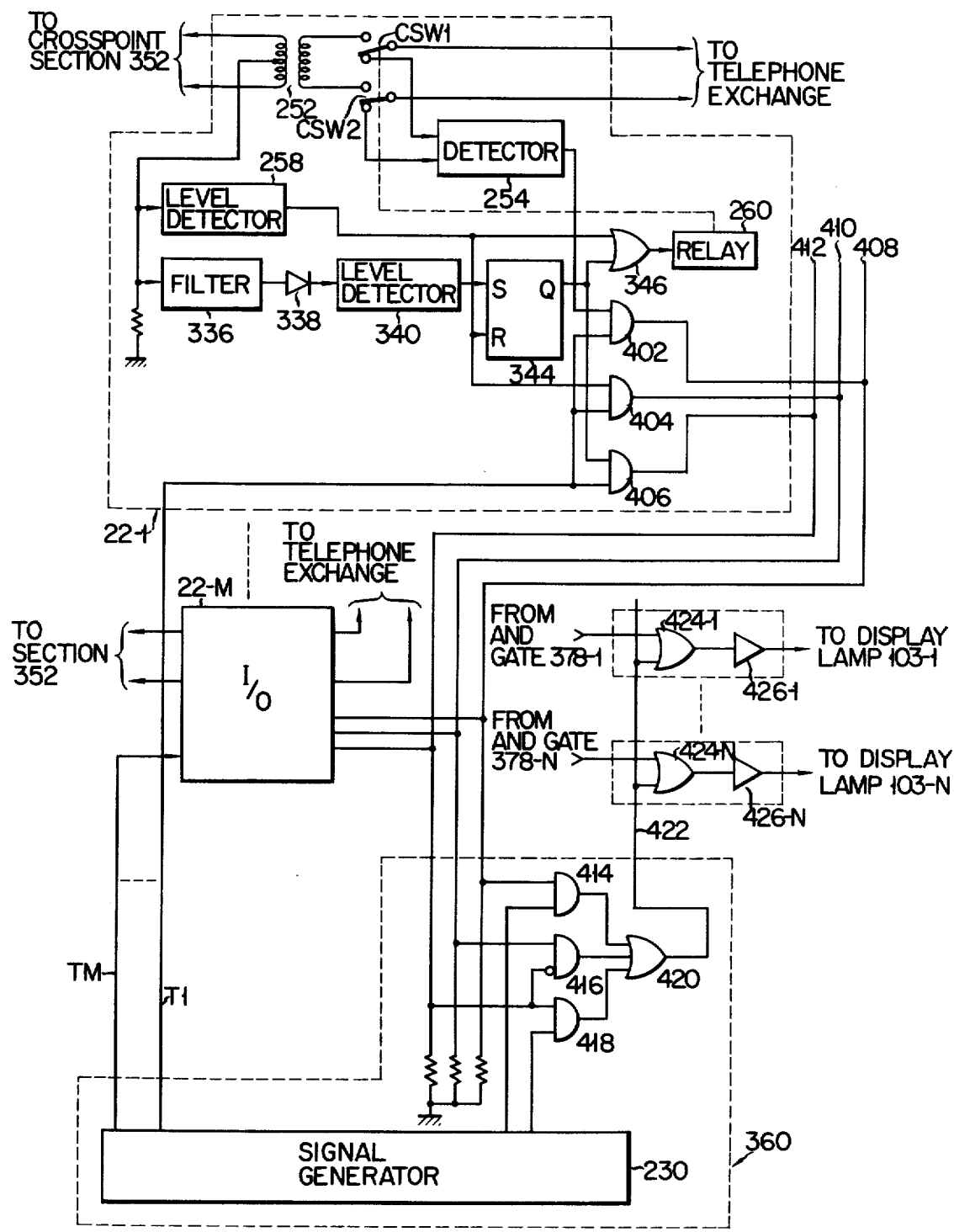
FIG. 8 shows a circuit diagram for illustrating the display function of the key telephone system shown in FIGS. 7A and 7B.

FIG. 8 shows a circuit with an outside line indication function of a key telephone system shown in FIG. 6. Logical gates 414, 416, 418 and 420 constitute a control circuit 386 in FIG. 7B. An OR gate 424 and a buffer 426 constitute part of control circuit 382 in FIG. 7B.

In the circuit, the I/O terminal devices 22-1 to 22-M are similar to one another in construction. Therefore, only the I/O terminal device 22-1 is illustrated in detail. The I/O terminal device 22-1 for outside line has a construction similar to that of the I/O terminal device for outside line shown in FIG. 2B or 4B. Accordingly, like portions are designated by the same numerals in FIG. 2B or 4B.

Figure 4B:
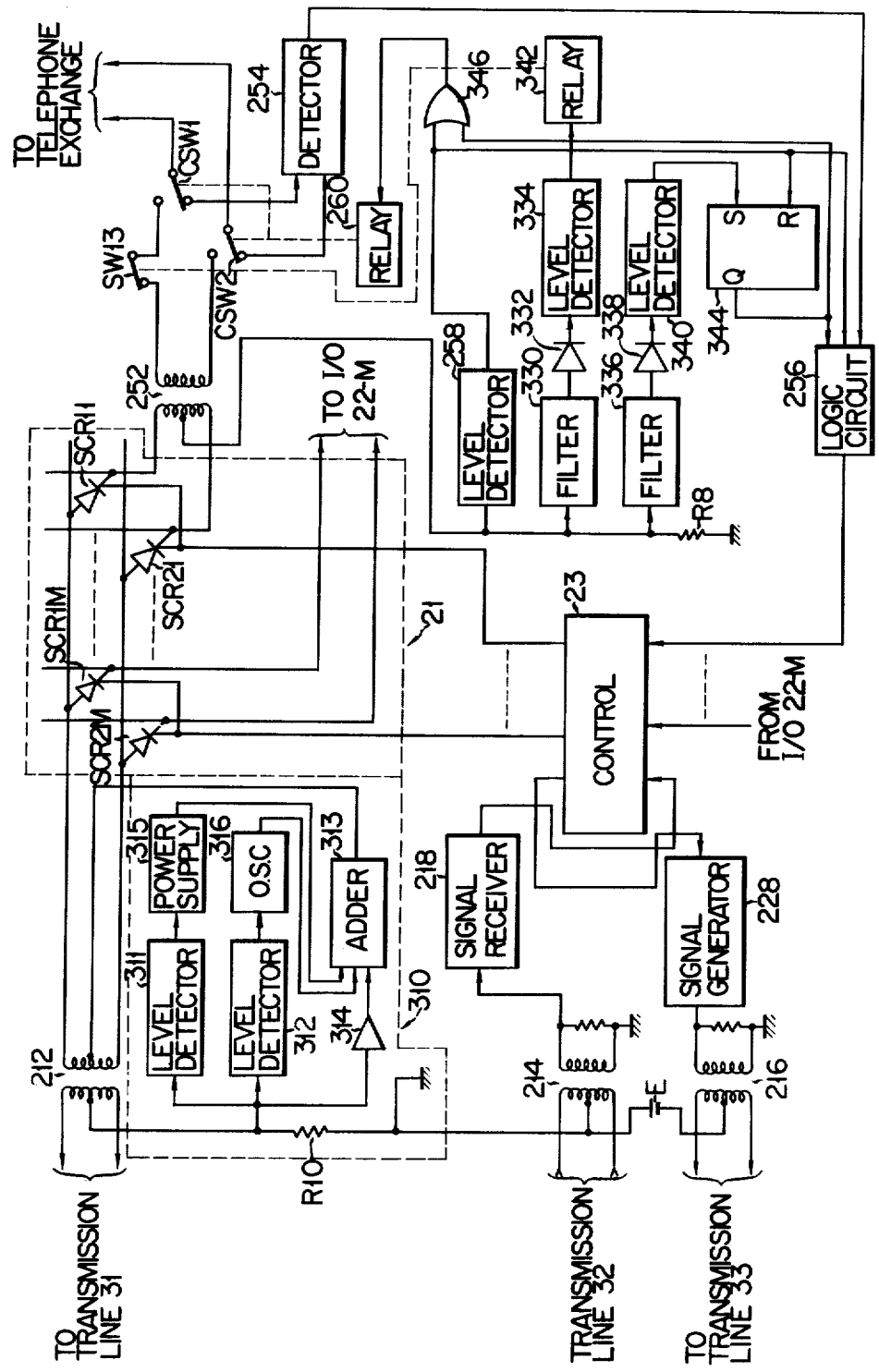
Figure 9:
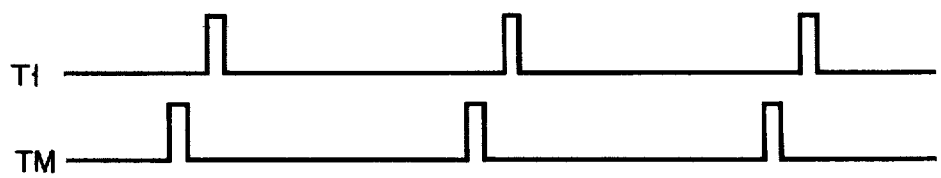
FIGS. 9 and 10 show signal waveforms for illustrating the display operation of the circuit in FIG. 8.
Figure 10:
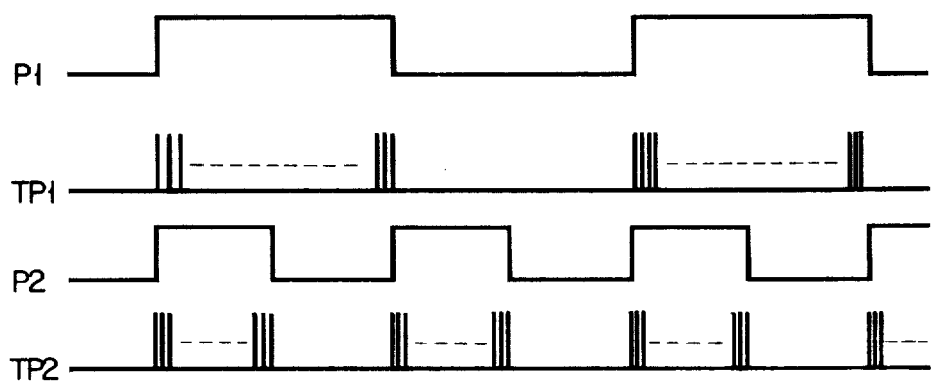

The circuit corresponding to the logic circuit in FIG. 2B or 4B includes three AND gates 402, 404 and 406. The AND gates 402, 404 and 406 are connected at one input terminal with the incoming call signal detector 254, a level detector 258 and the output terminal Q of a flip-flop circuit 344, respectively, and receive at the other input terminal the timing signal T1 with a pulse width, for example, 1/1200 second and a repetition rate of 75 KHz from the signal generating circuit 230. The output terminals of these AND gates 402, 404 and 406 are connected to three common lines 408, 410 and 412, respectively. The three common lines 408, 410 and 412 are coupled to the respective input terminals of AND gates 414, 416 and 418. The AND gates 414 and 418 receive at the other input terminal 1 Hz and 2 Hz signals P1 and P2 (FIG. 10) from the signal generating circuit 230, respectively. The AND gate 416 is coupled at the other input terminal with the common line 412 through an inverter. The output terminals of the AND gates 414, 416 and 418 are coupled with an OR gate 420. The output terminal of the OR gate 420 is coupled with OR gates 424-1 to 424-N, through a common line 422. The OR gates 424-1 to 424-N are connected to transmission cables 33 through buffer registers 426-1 to 426-N. The OR gates 424-1 to 424-N are connected at the other input terminal to the output terminals of respective AND gates 378-1 to 378-N which are connected at one input terminal to the output lines of the decoder 380 through the inverters. To the I/O terminal device 22-M is applied a timing pulse TM (FIG. 9).

When none of the telephones are used, the AND gates 402, 404 and 406 are all disabled and "0" level signal goes through common lines 408, 410 and 412 to the AND gates 414, 416 and 418 to disable them. Accordingly, after passing the OR gate 420, the "0" level signal goes through the OR gates 424-1 to 424-N and the buffer 426-1 to 426-N to the respective indication lamps 103-1 to 103-N. As a result, none of the indication lamps is lighted.

When an incoming call signal is transmitted from the telephone exchange of a telephone office to the key telephone system, the incoming call signal detector 254 provides an output signal toward the AND gate 402. This permits the timing pulse T1 from the signal generating circuit 230 to go through the AND gate 402 and the calling common line 408 to the AND gate 414. The AND gate 414 receiving at the other input terminal the 1 Hz pulse P1 shown in FIG. 10 from the signal generator 230, sends out a timing pulse TP1 of 75 Hz every 0.5 second through the OR gate 420. The timing pulse from the OR gate 420 goes through the OR gates 424-1 to 424-N and the buffers 426-1 to 426-N to the indication lamps 103-1 to 103-N. The result is flashing of the indication lamp at 1 Hz for indicating the outside line used for calling.

When the called party responds to the call, i.e. the handset 101-1 of the key telephone 10-1, for example, is picked up, the level detector 258 energizes the relay circuit 260 through the OR gate 346 so that the channel switches CSW1 and CSW2 are set at the first movable contact and the output signal of the level detector 258 is transferred to the reset terminal R of the flip-flop circuit 344 and to the AND gate 404. Accordingly, the AND gates 402 and 406 are disabled, the AND gate 404 is enabled, and the timing pulse T1 from the signal generator 230 is transferred to the AND gate 416 through the AND gate 404 and the message common line 410. In this case, the AND gate 416 is disabled since the output signal of the AND gate 406 is at "0" level, thereby to permit the timing signal T1 fed through the message line 410 to pass therethrough. Accordingly, the corresponding indication lamp is lighted.

Additionally, when the holding key switch SW3 is operated, the flip-flop circuit 344 is set, as mentioned above. Accordingly, the relay circuit 260 is energized to hold the channel switches CSW1 and CSW2 at the first movable contact, and at the same time to supply an output signal to the AND gate 406 to enable the same. As a result, the timing pulse T1 passes through the AND gate 406 and the holding common line 412 to the AND gate 418 and at the same time through the inverter to the AND gate 416. Then, the output signal of the AND gate 416 becomes at "0" level and the AND gate 418 sends out a timing pulse of 75 Hz at the interval of ¼ second through the OR gate 420. The timing pulse from the OR gate 424 goes to the indication lamps 103-1 to 103-N through the OR gates 424-1 to 424-N and the buffers 426-1 to 426-N so that the indication lamp indicating the outside line used for calling is flashed at a frequency of 2 Hz.

Figure 11:
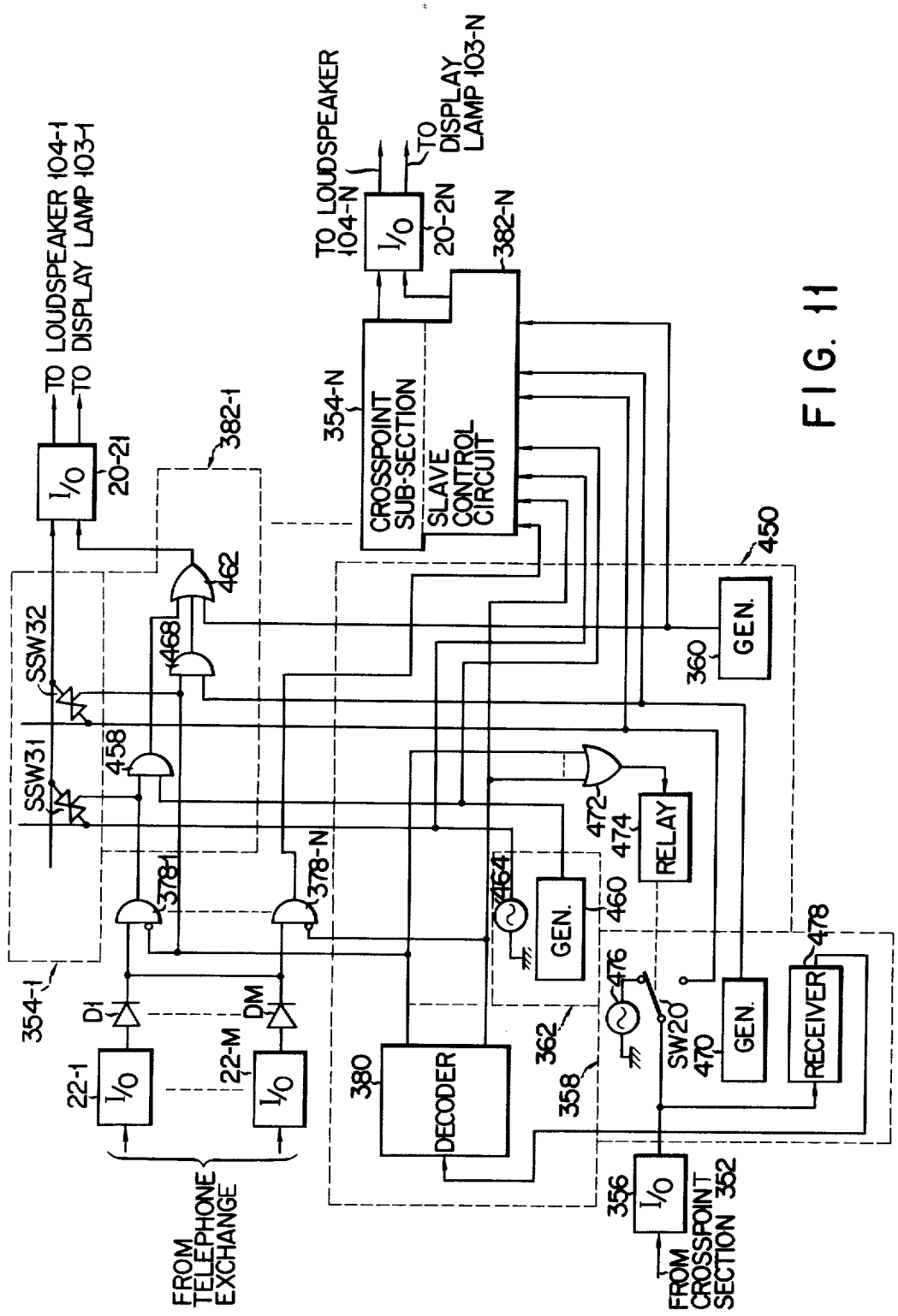
FIG. 11 shows a circuit diagram for illustrating a call function of the key telephone system.

FIG. 11 shows a circuit with an incoming call function in the key telephone system in FIG. 6.

The control circuit 360 in FIG. 6 corresponds to the construction including a main control circuit 450 and sub-control circuits 382-1 to 382-N in FIG. 11. The crosspoint section 354 is divided into crosspoint subsections 354-1 to 354-N and these subsections are correspondingly combined with the subcontrol circuits 382-1 to 382-N, respectively, for easy of explanation.

The I/O terminal devices 22-1 to 22-M are coupled with the subcontrol circuits 382-1 to 382-N through diodes D1 to DM, respectively. The constructions of the slave control circuits 382-1 to 382-N are identical to one another and the explanation will be given only about the subcontrol circuit 382-1.

The cathodes of the diodes D1 to DM are coupled with the input terminal of an AND gate 378 in the subcontrol circuit 382-1. The AND gate 378 is connected at the output terminal to one of the input terminals of an AND gate 458 and a gate terminal of a semiconductor switch SSW31 constituting a crosspoint in the crosspoint subsection 354-1. The AND gate 458 is connected at the other input terminal to an outside line call signal generator 460 in a signal generating circuit 362 and at the output terminal connected to the I/O terminal device 20-21 through an OR gate 462. End terminals of the semiconductor switch SSW31 are connected to a call tone ringer generator 464 and the I/O terminal device 20-21, respectively.

The AND gates 378 are connected at the other input terminal to the output terminals of the decoder 380 through the inverters, respectively. Each of the output terminals of the decoder 380 is connected to the input terminal of the corresponding AND gate 468 and to the gate terminal of a semiconductor switch SSW32 forming a crosspoint in the crosspoint subsection 354. The AND gate 468 is connected at the other input terminal to a call signal generator 470 in the intercom call circuit 358 and at the output terminal to the I/O terminal device 20-21 through an OR gate 462. The semiconductor switch SSW32 is connected between the first movable contact of the relay switch SW2 and the I/O terminal device 20-21.

The output terminals of the decoder 380 are also coupled with the relay circuit 474 through an OR gate 472. When the relay circuit 474 is energized, it turns the relay switch SW20 from the second movable contact connected to a busy tone signal generator 476 to the first movable contact. The fixed contact of the switch SW20 is connected to the output terminal of the I/O terminal device 356. The output terminal of the I/O terminal device 356 is also coupled with a multifrequency signal receiver 478. The output terminal of the receiver 478 is connected to the input terminal of the decoder 380 to produce an output signal corresponding to a dial input signal representing an intercom dial number. The other input terminal of the OR gate 462 is coupled with an indication signal generator 360 for generating an indication pulse at a preset frequency.

The operation of the call circuit shown in FIG. 11 will be given below.

Assume that an incoming call signal comes in from a telephone exchange in a telephone office. In this case, the call signal is applied to the subcontrol circuits 382-1 to 382-N through one of the diodes D1 to DM in the I/O terminal device coupled with the outside line through which the call signal has been transmitted. Assume now that an intercom call is not made. Accordingly, the I/O terminal device 356 produces no output. If all the output signals of the decoder 380 are "0", the call signal applied to the AND gate 378 goes to the gate terminal of the semiconductor switch SSW31 to turn on the switch SSW31. Accordingly, the tone ringer signal from the tone ringer generator 464 goes through the semiconductor switch SSW31 and the I/O terminal device 20 to the loudspeaker 104 to drive the same.

At this time, the AND gate 458 has been enabled by the output signal of the AND gate 378 so that the output signal from the control signal generator 460 for outgoing call passes through the AND gate 458, the OR gate 462 and the I/O terminal device 20 to the indication lamp 103. Finally, the indication lamp representing the outside line used for transmitting the call signal is lighted.

In the case of the intercom call, as described with reference to FIGS. 6 and 7, the handset 101-N, for example, is picked up, and the outside line selection key 105-N is actuated for effecting the intercom talking. Through this operation, the key telephone 10-N is connected to the intercom line I/O terminal device 356. Then, when the calling party dials the intercom number of the called party through actuating of the multi-frequency dial key switch, for example, the dial signal receiver 478 supplies an output signal corresponding to the dial signal to the decoder 380. Upon receipt of the output signal of the receiver 478, the decoder 380 produces an output signal which in turn is supplied to the subcontrol circuit corresponding to the key telephone of the called party. In this example, the key telephone 10-1 is called. The output signal of the decoder 380 goes through the first output line thereof to the AND gate 378 to disable the same, so that the AND gate 378 prohibits the output signals of the I/O terminal devices 22-1 to 22-M from passing therethrough. The output signal of the decoder 380 is applied to the AND gate 468 and the gate of the semiconductor switch SSW32 and to the relay circuit 474 through the OR gate 472. Then, the output signal of the relay circuit 474 sets the relay switch SW20 to the first movable contact. The voice signal from the key telephone 10-N reaches the loudspeaker 104-1 through the crosspoint module 21, the I/O terminal device 356, the relay switch SW20, the semiconductor switch SSW32 turned on and the I/O terminal device 20-21. The loudspeaker produces a voice paging. At the same time, the output signal of the call control signal generator 470 is applied through the AND gate 458 enabled, the OR gate 462, the I/O terminal device 20-1 and the S/P converter 122 to an amplifier 150 for the loudspeaker 104-1.

When the intercom dial number other than the predetermined ones is specified, the output signals of the decoder 380 are all "0", the OR gate 472 produces a "0" level signal, and the relay circuit 474 is not energized. Accordingly, the relay switch SW20 is held at the second movable contact, so that the busy tone signal generator transfers a busy tone signal to the key telephone 10-1 via the I/O terminal device 356, the crosspoint module 21 and the I/O terminal device 20-11.

Figure 12:
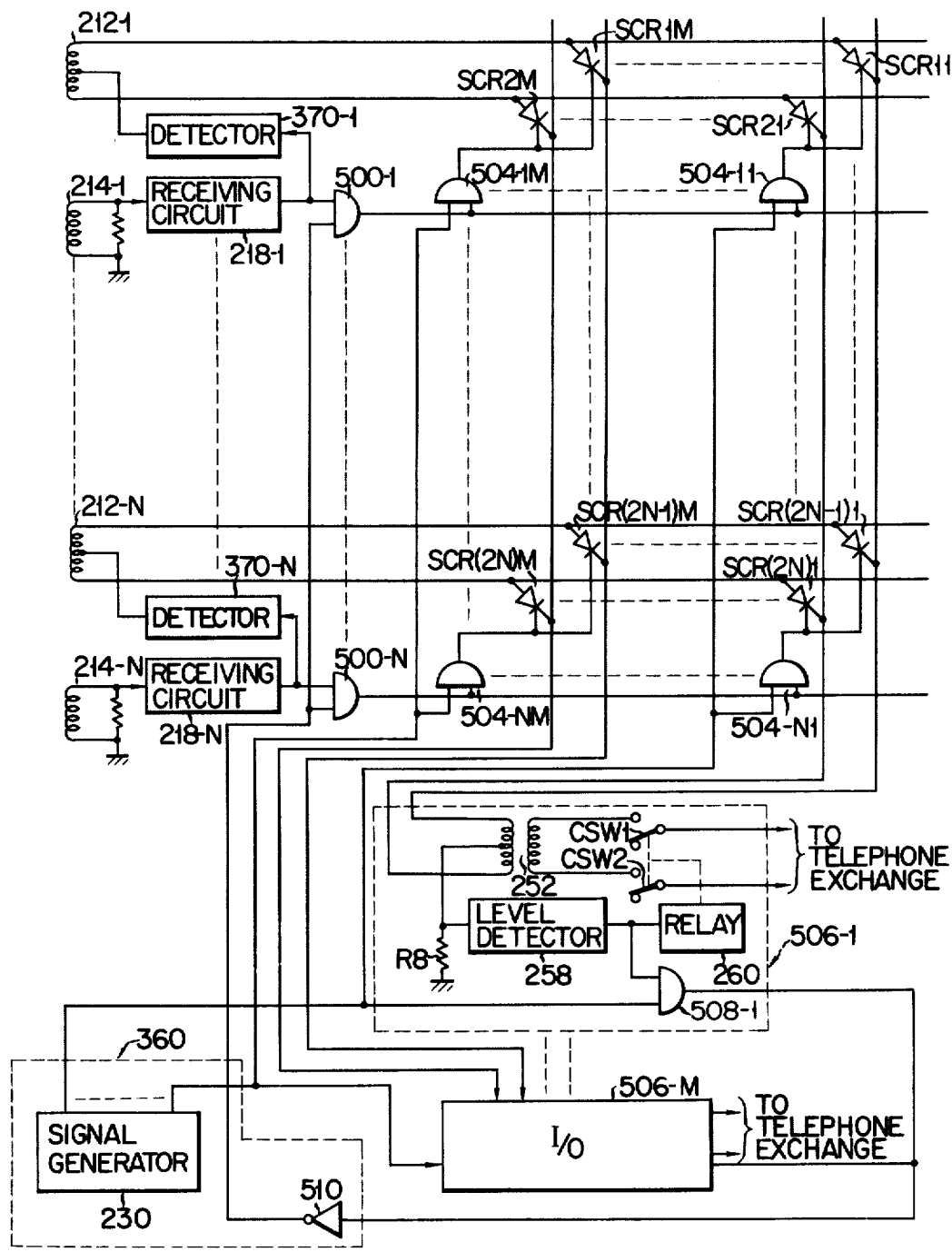
FIG. 12 shows a circuit diagram for illustrating a privacy control function of the key telephone system.

FIG. 12 shows a circuit for illustrating the private control function of the key telephone system shown in FIG. 6. In the figure, the down-control circuit is omitted for the sake of simplicity. In FIG. 12, the control circuit 384 in FIG. 7B is constituted by an inverter 510 and the control circuit 302-1 in FIG. 7B is constituted by AND gates 504-11 to 504-1M.

In FIG. 12, the primary windings (not shown) of the transformers 212-1 and the 214-1 are connected to the transmission cables 31-1 and 32-1 for the key telephone 10-1, respectively. The primary windings of the transformers 212-N ad 214-N are similarly connected with respect to the key telephone 10-N. The secondary winding of the transformer 214-1 is connected to the signal receiving circuit 218-1 like the up-control information signal receiving circuit 218 shown in FIG. 2B, for example. The output terminal of the receiving circuit 218-1 is coupled with the input terminal of an AND gate 500-1 and with a hook signal detector 370-1. Upon receipt of the hook switch signal from the receiving circuit 218-1, the detector 370-1 applies a voltage to the anodes of the thyristors SCR11 to SCR1M and the SCR21 to SCR2M. The output terminal of the AND gate 500-1 is connected to the input terminals of the AND gates 504-11 to 504-1M for controlling the gate terminals of the paired thyristors SCR11 and SCR21, . . . and SCR1M and SCR2M.

Similar connection is made with respect to the circuit components such as the transformers 212-N and 214-N, the signal receiving circuit 218-N, hook switch signal detector 370-N, AND gates 500-N, 504-N1 to 504-NM, semiconductor switches SCR(2N-1)1 to SCR(2N-1)M and SCR(2N)1 to SCR(2N)M.

Figure 13:
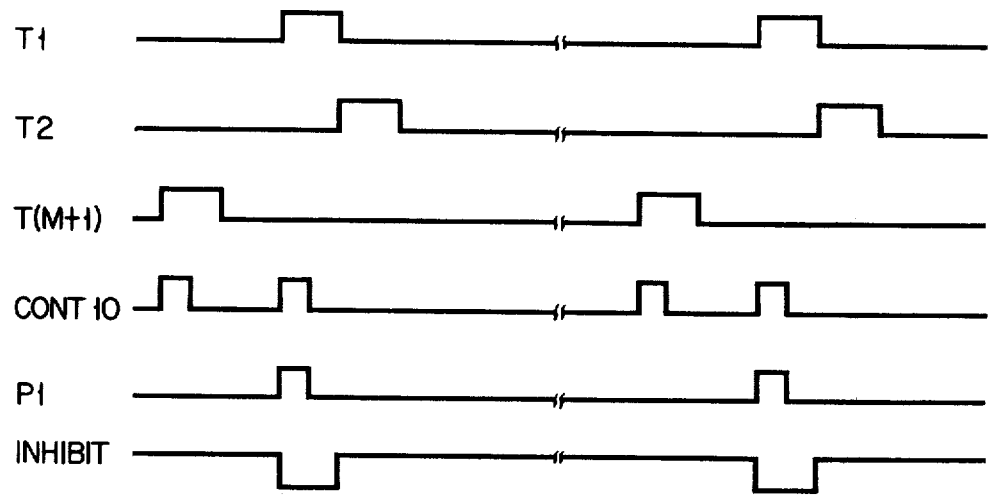
FIG. 13 shows signal waveforms for illustrating the operation of the circuit shown in FIG. 12.

The signal generator 230 for generating timing pulses T1, T2, . . . TM, T(M+1) as shown in FIG. 13 applies a timing pulse T1 to the other input terminal of each of the AND gates 504-11 to 504-N1 and a timing pulse TM to the AND gates 504-1M to 504-NM.

The cathodes of the thyristors SCR11 to SCR(2N)1 are coupled with the I/O terminal device 506-1. The thyristors SCR1M to SCR(2N)M are similarly connected to the I/O terminal device 506-M. These I/O terminal devices 506-1 to 506-M correspond to the I/O terminal device 22-1 shown in FIG. 2B in which the logic circuit is constructed by an AND gate 508. The output terminal of the AND gate 508 is connected to a message line in the same manner as the AND gate 404 in FIG. 8. Timing pulses T1 to TM are applied to the other input terminal of the AND gates 508-1 to 508-M. The output terminals of the AND gates 508-1 to 508-M are connected to the inverter 510 forming a private control section of the control circuit 360. The output of the inverter 510 is connected to the other input terminal of the AND gates 500-1 to 500-N. In FIG. 12, the first movable contacts of the channel switches CSW1 and CSW2 are connected to a detector 254 in the same manner as shown in FIG. 2B.

The operation of the circuit shown in FIG. 12 will be given below.

For making a phone call by using the key telephone 10-1 the handset 101-1 is picked up to produce a hook switch signal as mentioned above. The hook switch signal is produced in synchronism with the timing pulse T(M+1). The hook switch signal is applied to the hook signal detector 370-1 through the control information signal receiving circuit 218-1. When the detector 370-1 detects that the output signal from the receiving circuit 218-1 includes a pulse generated at the timing T(M+1), it produces a fixed current signal and applies a voltage to the anodes of the thyristors SCR11 to SCR2M. Then, the line selection key switch 105 is actuated for selecting a desired outside line. Upon the actuation, the receiving circuit 218-1 produces a control signal "CONT 10" shown in FIG. 13. Under this condition, the thyristors SCR11 and SCR21 have been turned on and thus the output signals of the level detector 258 of the I/O terminal device 506-1 becomes "0" level to disable the AND gate 508-1. Accordingly, the inverter 510 produces a "1" level signal at the timing T1 to enable the AND gate 500-1. Therefore, the outside line specifying pulse P1 of the output signal from the receiving circuit 218-1 is applied to the gate terminals of the thyristors SCR11 and SCR21, through the AND gate 500-1 and the AND gate 501-11 receiving the timing pulse T1, thereby to turn on the thyristors SCR11 and SCR21. Following this, the thyristors SCR11 and SCR21 are self-sustained in on-condition. As a result, the level detector 258 of the I/O terminal device 506-1 produces a high level output signal to set the channel switches CSW1 and CSW2 to the first movable contact and at the same time to enable the AND gate 508-1. Thus, the key telephone 10-1 is connected to the outside line selected through the thyristors SCR11 and SCR21. The timing pulse T1 is supplied to the inverter 510 through the AND gate 508-1, and the inverter 510 produces an output signal exhibiting a low level during the period corresponding to the timing pulse T1. The output signal is applied to the AND gates 500-1 to 500-N as an "INHIBIT" signal representing that the outside line selected is now used. So long as the "INHIBIT" signal exists, if another key telephone specifies the outside line connected to the current key telephone 10-1, connection of the key telephone with the outside line is rejected. When another key telephone specifies an outside line other than that connected to the current key telephone, it is of course permissible that the key telephone and the specified line are smoothly connected. Further, when the handset 101-1 of the key telephone 10-1 is placed back on the hook to stop talking, the output signal of the inverter 510 exhibits a high level during the period corresponding to the timing pulse T1 so that, even if any key telephone specifies the outside line, the connection of the key telephone with the outside line is possible.

Figure 14:
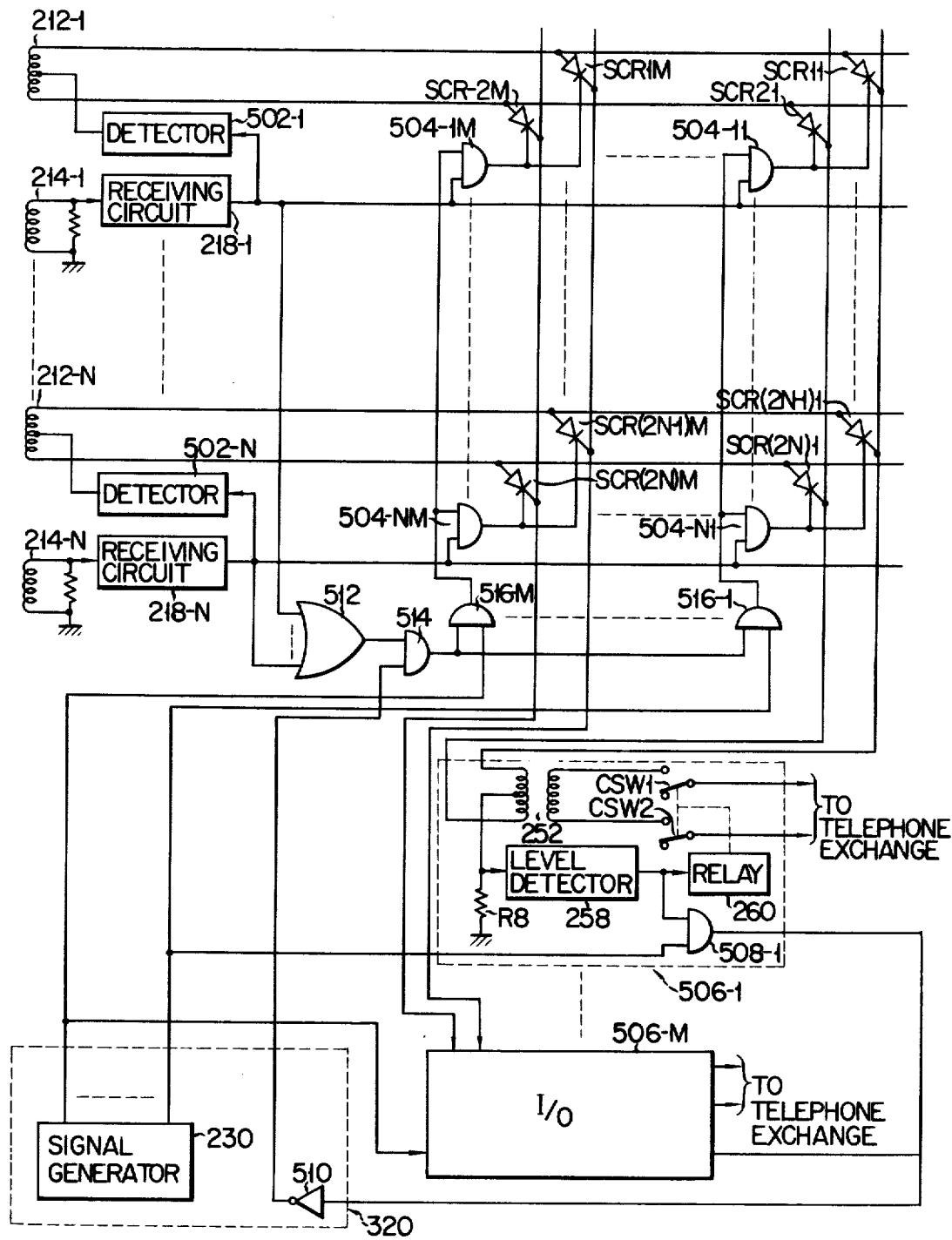
FIG. 14 shows a modification of the privacy control circuit shown in FIG. 12.

FIG. 14 shows a modification of the circuit with a private function shown in FIG. 12.

The circuit shown in FIG. 14 is substantially equal to that of FIG. 12 with minor exception. In place of the AND gates 500-1 to 500-N in FIG. 12, the circuit of FIG. 16 employs an OR gate 512 connected at the input terminals to the output terminals of the up-control information signal receiving circuits 218-1 to 218-N, an AND gate 514 connected at two input terminals to the output terminals of the OR gate 512 and an inverter 510, and AND gates 516-1 to 516-M connected at one input terminal to the output terminal of the AND gate 514 and receiving at the other input terminal respective timing pulses T1 to TM from the signal generator 230.

In telephoning, as in the previous examples, the handset 101-1 of the key telephone 10-1 is picked up and the line selection key switch 105-1 is depressed to specify the outside line connected to the I/O terminal device 506-1, for example. Then, the "CONT 10" signal in FIG. 13 is applied to the AND gate 514 through the OR gate 512. When the desired outside line is not used, i.e. the output signal of the inverter 510 is at high level during the period corresponding to the timing pulse T1, the output signal of the OR gate 512 is applied as an enable signal to the AND gates 516-1 to 516-M through the AND gate 514. The AND gate 516 receiving at the other input terminal the timing pulse T1 permits the output pulse of the AND gate 514 to pass therethrough as an enable signal to the AND gates 504-11 to 504-N1. An outside line specifying pulse P1 in the output signal from the receiving circuit 218-1 is applied to the gate terminal of the thyristors SCR11 and SCR21 to turn on the same. As a result, the key telephone 10-1 is connected to the specified outside line, and the level detector 258 produces a high level output signal which in turn enables the AND gate 508-1. By the enabling of the gate, the timing pulse T1 is supplied to the inverter 510 via the AND gate 508-1. The output signal of the inverter 510 exhibits a low level during the period corresponding to the timing pulse T1 and disables the AND gate 514 during the period T1. Therefore, so long as the key telephone is busy, it is impossible that another key telephone accesses the outside line currently used by the key telephone 10-1.

Generally, the number of the key telephones used in the key telephone system is larger than that of the outside lines used for connecting the key telephone system with a telephone office, i.e. N>M. Therefore, the logic circuit elements of the FIG. 14 circuit is smaller in number than those of the FIG. 12 circuit.

Figure 15:
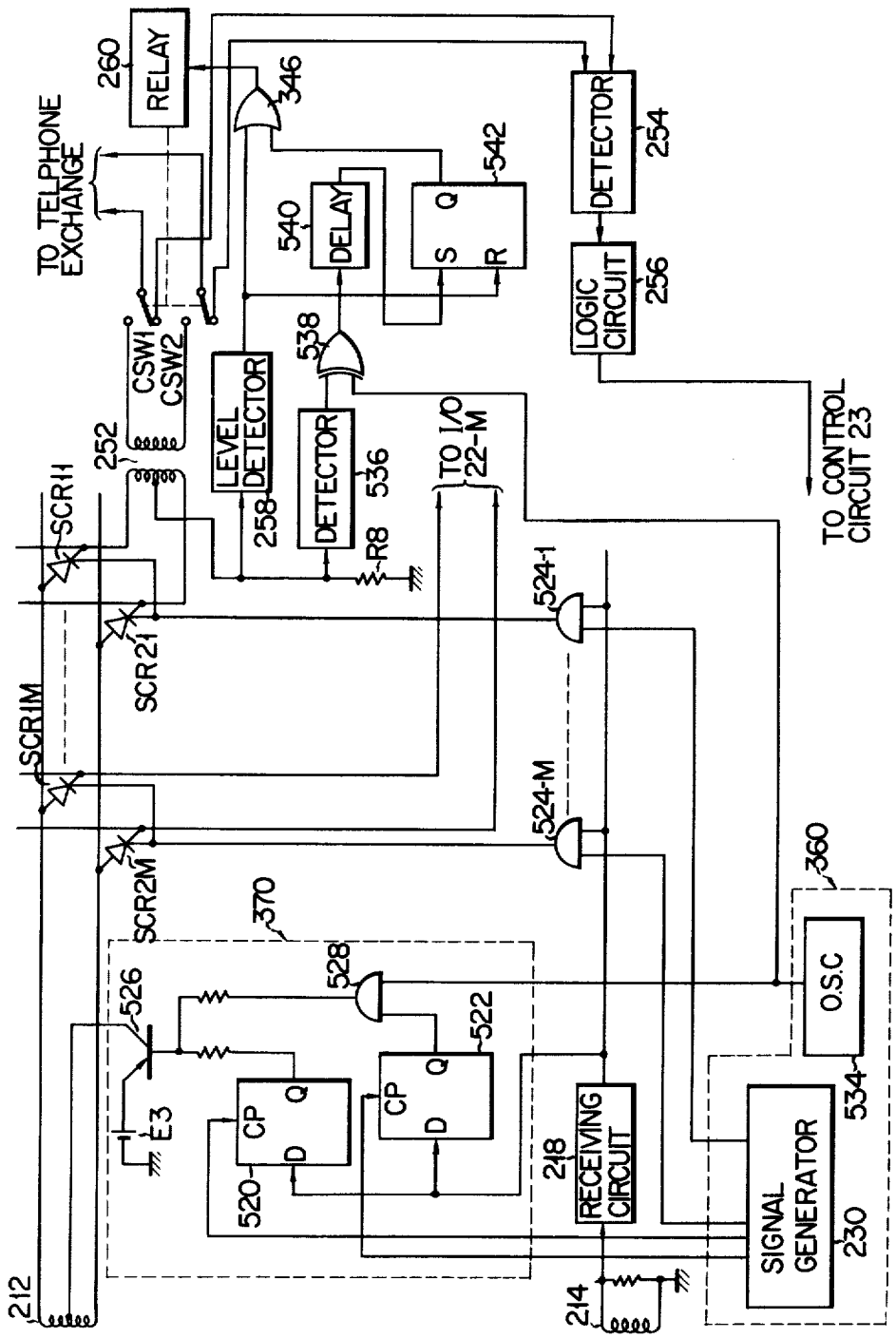
FIG. 15 shows a circuit diagram for executing the message control of the key telephone system.

FIG. 15 shows a circuit for illustrating the message control function of the circuit shown in FIG. 2 or 7.

The primary windings (not shown) of the transformers 212 and 214 are coupled with transmission cables 31 and 32. The secondary winding of the transformer 214 is coupled with the up-control information signal receiving circuit 218. The output terminal of the receiving circuit 218 is connected to the D input terminals of the flip-flop circuits 520 and 522 of the key switch signal detector circuit 370 and to the input terminals of the AND gates 524-1 to 524-M. The timing pulse T(M+1) from the signal generator for generating timing pulses T1, T2, ... T(M+1) and T(M+2) is applied to the clock terminal CP of the flip-flop circuit 520 and the output terminal Q thereof is connected to the base of a transistor 526 via a resistor. A timing pulse T(M+2) from the signal generator 230 is applied to the clock terminal CP of the flip-flop circuit 522 of which the output terminal Q is connected to one of the input terminals of the AND gate 528. The other input terminal of the AND gate 528 is connected to an oscillator 534. The output terminal of the AND gate 528 is connected to the base of a transistor 526. The transistor 526 is connected at the emitter to a DC power source E3 and at the collector to the center tap of the secondary winding of the transformer 212. The transistor 526 feeds a large current corresponding to the output signals of the flip-flop circuit 520 and the AND gate 528 to the anodes of thyristors SCR11 to SCR2M on the first row of the crosspoint module 21 through the secondary winding of the transformer 212. The gate terminals of these thyristors SCR11 to SCR2M are connected to the AND circuits 524-1 to 524-M which receive at the other input terminal the respective timing pulses T1 to TM. The cathodes of the thyristors SCR11 and SCR21 are connected to the primary winding of the transformer 252. The center tap of the primary winding of the transformer 252 is grounded via a resistor R8 and connected to the input terminals of the level detector 258 and the holding signal detector circuit 536. The detecting circuit 536 may be constructed by using the filter 336, the diode 338 and the level detector 240 shown in FIG. 4B, for example. The output terminal of the detecting circuit 536 is connected to the delay circuit 540, through the NOR gate 538. The NOR gate 538 is connected at the other input terminal to an oscillator 534. The output terminal of the delay circuit 540 is connected to the set terminal of a flip-flop circuit 542 which is connected at the reset terminal R to the level detector 258, and at the output terminal to the relay circuit 260 through the OR gate 346.

An incoming call signal which is transmitted from a telephone office through the relay switches CSW1 and CSW2, the detector 254 and the logic circuit 256, is applied to the control circuit 23, as mentioned above, and is processed as in the same manner as described before.

Figure 16:
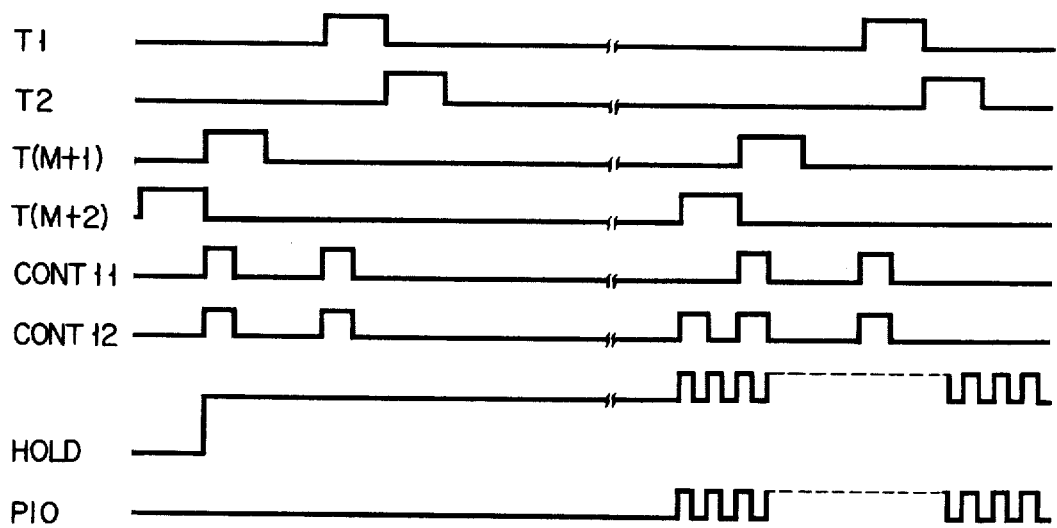
FIG. 16 shows a signal waveforms for illustrating the operation of the circuit shown in FIG. 15.

In telephoning, the handset of the key telephone 10-1 is picked up and then the line selection key switch 105 is actuated, with the result that the up-control information signal receiving circuit 218 produces a control signal "CONT 11" as shown in FIG. 16. At the timing T(M+1), the pulse included in the "CONT 11" signal and indicating the pick-up of the handset is applied to the D input terminal of the flip-flop circuit 520 so that the flip-flop circuit 520 is set and produces at the Q output terminal a set output signal to the base of the transistor 526. As a result, a voltage is applied to the anodes of the thyristors SCR11 to SCR2M. At the timing T1, the pulse representing the first outside line in the "CONT 11" is still supplied so that the AND gate 534-1 produces a high level signal to turn on the thyristors SCR11 and SCR21. For this, the level detector 258 produces a high level output signal to set the switches CSW1 and CSW2 to the first movable contact and at the same time to reset the flip-flop circuit 542.

Under this condition, when the hold key switch is actuated, the pulse corresponding to the hold key switch actuation is produced, and the receiving circuit 218 produces a control signal "CONT 12". At the timing T(M+2), a pulse representing the actuation of the hold key switch included in the "CONT 12" is applied to the D input terminal of the flip-flop circuit 522 so that the flip-flop circuit 522 is set and produces at the Q output terminal a high level output signal to the AND gate 528 to enable the same. Accordingly, the output pulse of the oscillator 534 goes through the AND gate 528 to the base of the transistor 526. Then, a hold signal "HOLD" is applied to the resistor R8 via the secondary winding of the transformer 212, thyristors SCR11 of SCR21, and the center tap of the primary winding of the transformer 252. The detecting circuit 536 detects the pulse in the current flowing through the resistor R8 which is produced during the holding period and produces a holding pulse P10. The NOR gate 538 receives the holding pulse P10 and supplies a high level output signal to the set terminal of the flip-flop circuit 542 through a delay circuit 540, thereby to set the flip-flop circuit 542. The set output signal of the flip-flop circuit 542 is applied to the relay circuit 260 via the OR gate 346 to hold the channel switches CSW1 and CSW2 at the first movable contact.

The hold key switch temporarily interrupts hook switch information after a prescribed time since the hold key switch is actuated and then is automatically turned off. Upon the turning-off, the flip-flop circuits 520 and 522 are reset and thyristors SCR11 and SCR21 are turned off. Accordingly, the output signal of the delay circuit 560 becomes at a low level and the flip-flop circuit 542 is held in set condition. Thus, during the outside line holding, the thyristors SCR11 and SCR21, for example, are turned off and the channel switches CSW1 and CSW2 are held at the first movable contact and the selected outside line is held.

Figure 17:
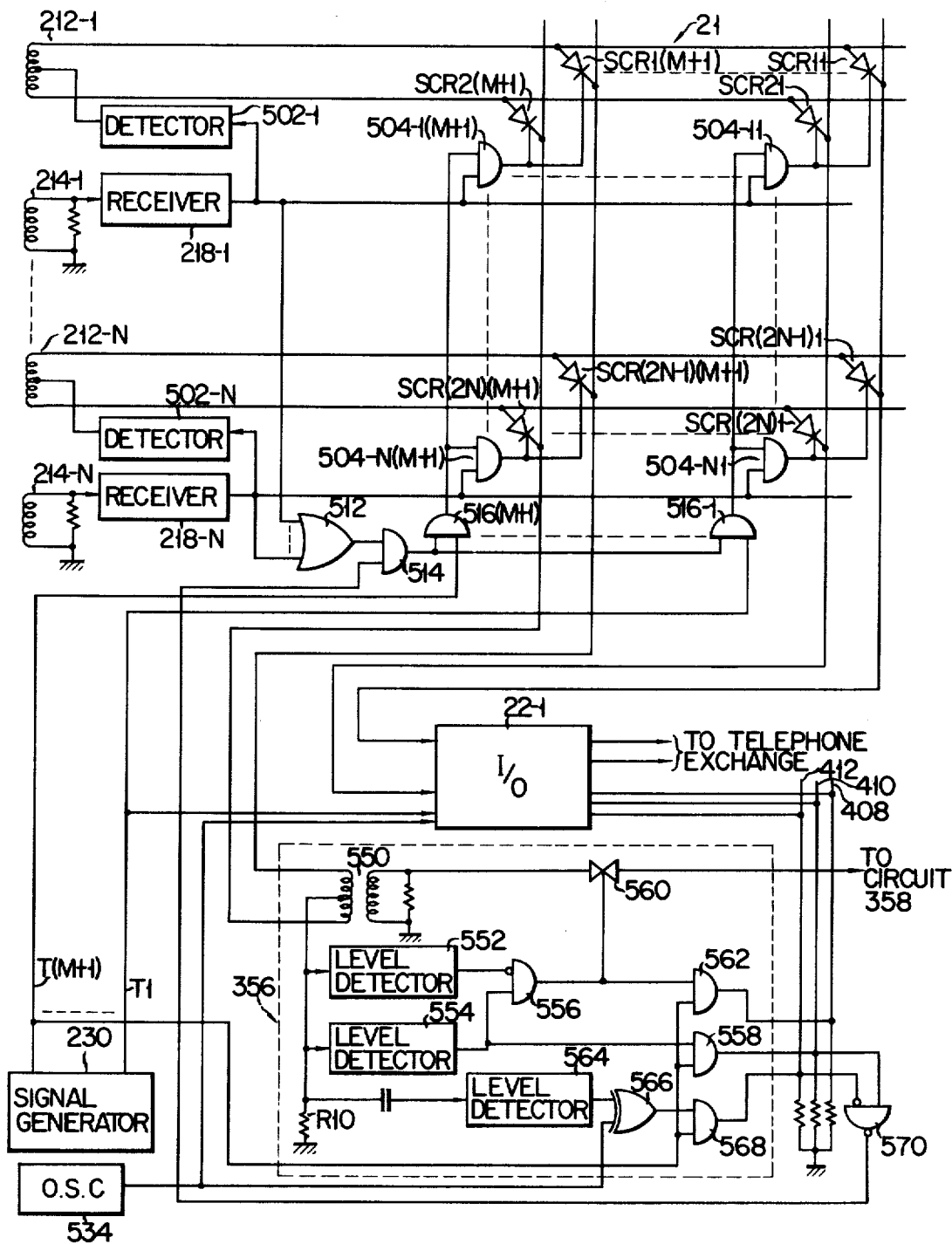
FIG. 17 shows a circuit diagram of an intercom circuit of the key telephone system.

FIG. 17 is a circuit for illustrating the intercom talking function of the key telephone system shown in FIGS. 6 and 7.

In this circuit, the crosspoint section 352 for the outside line circuit and the function of the control circuit for controlling the crosspoint module 21 and the crosspoint section 354 are substantially the same as those of the circuits in FIG. 14.

An intercom circuit 536 is provided with a transformer 550 connected at the primary winding to a pair of column lines of the crosspoint module 21. The center tap of the primary winding of the transformer 550 is grounded through a resistor R10 and connected to the level detectors 552 and 554. The output terminal of the level detector 552 is connected to the AND gate 556 through an inverter. The output terminal of the level detector 554 is connected to the other input terminal of the AND gate 556 and to the AND gate 558. The output terminal of the AND gate 556 is coupled with the gate terminal of the semiconductor switch 560 for coupling the secondary winding of the transformer 550 with the AND gate 562 and with the intercom call circuit 358 shown in FIG. 11. The center tap of the primary winding of the transformer 550 is further coupled with the level detector 564 through a capacitor. The output terminal of the level detector 564 is connected to the NOR gate 566 receiving at one input terminal the output signal of an oscillator 534. The output terminal of the NOR gate 566 is coupled with one of the input terminals of the AND gate 568. The signal generator 230 supplies the timing pulse T(M+1) used for specifying the intercom circuit 356 to the other input terminal of the AND gates 558, 562 and 568. The output terminals of the AND gates 558, 562 and 568 are coupled with the call common line 408, the message common line 410 and the hold common line 412, respectively. The message common line 410 is connected to one of the input terminals of the NAND gate 570. The other input terminal of the NAND gate 570 is connected through an inverter to the hold common line 412. The output terminal of the NAND gate 570 is coupled with the AND gate 514. The NAND gate 570 constitutes the control circuit 384 shown in FIG. 7B.

For making an intercom call, the handset 101-1 of the key telephone 10-1 is picked up and the line selection key switch 105-1 is pressed. In this case, as mentioned above, the transformer 212-1 is coupled with the transformer 550 through thyristors SCR1(M+1) and SCR2(M+1). As a result, current flows into the resistor R10 from the detector 502-1 through the secondary winding of the transformer 212-1, thyristors SCR1(M+1) and SCR2(M+3), and the center tap of the primary winding of the transformer 550. At this time, the level detector 552 does not detect the current flowing through the resistor R10 and produces "0" level output signal. On the other hand, the level detector 554 detects the current flowing through the resistor R10 and produces a "1" level signal. Therefore, the AND gate 556 produces a high level output signal and the semiconductor switch 560 is turned on. The AND gate 558 is enabled to permit the timing pulse T(M+1) from the signal generator 230 to pass therethrough to the message common line 410. At present, the hold switch SW3 is not operated so that the AND gate 568 produces a "0" level signal. Accordingly, the NAND gate 570 provides the "0" level signal as an inhibit signal to the AND gate 514. As a result, the AND gate 514 prohibits a pulse corresponding to the timing pulse T(M+1) for specifying the intercom line circuit 356 and included in the signal applied to the AND gate 514.

Under this condition, when the key switch 102 is operated for calling the called party, a dial signal corresponding to the operation of the key switch 102-1 is sent to the intercom call circuit 358 through the transformer 212-1, the thyristors SCR1(M+1) and SCR2(M+1), the transformer 550 and the semiconductor switch 560. Then, the dial signal is processed as described with reference to FIG. 11 to drive the loudspeaker of the key telephone of the called party and to light the indication lamp.

For answering the intercom call, for example, the handset 101-N of the telephone set 10-N is picked up and the key switch 105-1 corresponding to the lighting indication lamp is operated. As a result of the operation, the thyristors SCR(2N-1)(M+1) and SCR(2N)(M+1) are turned on so that a large current flows into the resistor R10 through the detector 502-N, the transformer 212-N, the thyristors SCR(2N-1) (M+1) and SCR(2N)(M+1), and the transformer 550. Therefore, the level detectors 552 and 554 produce high level output signals which enable the AND gate 556 and turn off the semiconductor switch 560. In this manner, it is possible to make an intercom call between the key telephones 10-1 and 10-N.

When the hold switch SW3 is operated, as previously described, the thyristors SCR1(M+1) and SCR2(M+1) are turned off and the level detector 552 produces an output signal of "0" level. Thus, the AND gate 556 is enabled to turn on the semiconductor switch 560.

Having described the invention using some embodiments, the invention is not limited to only the embodiments mentioned.

For example, in place of the loudspeaker 104, suitable means having a microphone and speaker function may be used. In such a case, when an intercom voice paging is made, the called party may answer to the calling party by a voice through the means and the voice transmission path.

In FIG. 2, the secondary winding of the transformer 152 for the loudspeaker 104 is connected between the center taps of the secondary windings of the transformers 116 and 130, and the primary winding of the transformer 264 for the oscillator 262 is connected between the center taps of the primary windings of the transformers 212 and 214. However, it is also possible to connect the transformer 152 between the center taps of the secondary windings of any two of the transformers 116, 130 and 134 and to connect the transformer 264 between the center taps of the primary windings of corresponding two of the transformers 212, 214 and 216.

What we claim is:

1. A key telephone system comprising:
   a plurality of key telephones each having a handset, a first control signal generator circuit producing an output signal for specifying a line to be used, and first and second key telephone terminal sections;
   a plurality of transmission paths each having first, second and third transmission cables;
   a key service unit including a crosspoint module, a control section having input and output circuits, at least one first key service terminal section and at least one second key service terminal section for coupling the crosspoint module with an outside line; and
   a plurality of coupling means each including a first coupling section for coupling one of said handsets, one of said first control signal generator circuits, and one of said first key telephone terminal sections with said crosspoint module, the input and output circuits of said control section, through said first, second and third transmission cables, respectively and a second coupling section for coupling said first key service terminal section with one of said second key telephone terminal sections to permit transfer of an information signal between the second key telephone terminal section and the first key service terminal section through a phantom circuit formed of two of said first, second, and third transmission cables; wherein said control section responds to an up-control signal fed from said first control signal generating circuit via said second transmission cable to provide a control signal to said crosspoint module, thereby connecting said key telephone to said second key service terminal section coupled to a specified line through said first transmission cable and said crosspoint module, and further responds to an incoming call signal to send a down-control signal to said first key telephone terminal section of each of said key telephones through said third transmission cable.

2. A key telephone system according to claim 1, wherein said first coupling section includes first, second and third transformers for coupling the handset, the first control signal generating circuit and the first key telephone terminal section of each key telephone with said first, second and third transmission cables, and fourth, fifth and sixth transformers for coupling said first, second and third transmission cables at the other end with the crosspoint module and the input and output circuits of said control section in said key service unit, and said second coupling section includes a seventh transformer whose primary winding is connected to said second key telephone terminal section and whose secondary winding is connected between the center taps of the secondary windings of two of said first, second and third transformers and an eighth transformer whose primary winding is connected between the center taps of the secondary windings of corresponding two of said fourth, fifth and sixth transformers and whose secondary winding is connected to said first key service terminal section of said key service unit.

3. A key telephone system according to claim 2, in which said first key service terminal section of said key service unit include a switch which is controlled by said control section and an oscillator connected in series with said switch, and said second key telephone terminal section is a loudspeaker.

4. A key telephone system according to claim 3, wherein said control section includes a detection circuit for detecting a call signal transmitted through the outside line and an energizing circuit which responds to an output signal of said detecting circuit to close said switch.

5. A key telephone system according to claim 2, wherein said control section includes a call signal detection circuit which responds to a call signal transmitted through an outside line and sends through said third transmission cable to said first key telephone terminal section the down-control signal corresponding to the outside line used for transmitting the call signal.

6. A key telephone system according to claim 5, wherein said first key telephone terminal section is provided with a first control signal receiving circuit for receiving the down-control signal from said call signal detection circuit, and indicating means for indicating an outside line, and a drive circuit for said indicating means which selectively responds to an output signal from said first control signal receiving circuit to energize said indicating means.

7. A key telephone system according to claim 6, wherein said indicating means is formed of a plurality of light emitting diodes.

8. A key telephone system according to claim 2, wherein said first control signal generating circuit includes a switching circuit having a hook switch which is closed responsive to the pick-up of the handset and a plurality of switches for specifying any one of lines and a first control signal generator for transmitting a hook signal and a line specifying signal to the input circuit of said control section through said second transmission cable, in response to the output signal of said switching circuit, and the input circuit of said control section includes a plurality of first control signal receiving circuits which respond to a line specifying signal from said first control signal generating circuit to control said crosspoint module to selectively connect said fourth transformers and said second key service terminal sections, and a plurality of hook signal detection circuits which respond to hook signals from said first control signal generators to produce output signals to crosspoints coupled with the secondary winding of said fourth transformer through the center tap of the secondary winding of said fourth transformer.

9. A key telephone system according to claim 8, wherein said control section includes a timing pulse generator for applying a clock signal and a synchronizing signal to said first control signal generating circuit and for producing timing signals in synchronism with said clock signal and said synchronizing signal to said input circuit.

10. A key telephone system according to claim 8, wherein said control section includes a timing pulse generator for applying a clock signal and a synchronizing signal to said first control signal generating circuit and for producing timing signals in synchronism with said clock signal and said synchronizing signal to said input circuit, said crosspoint module includes semiconductor switches each having a gate terminal and arranged in a matrix fashion which are coupled at one end terminal with said second key service terminal sections, and said first control signal receiving circuits each having a first AND circuit which receives at one input terminal an output signal from said first control signal generating circuit and at the other input terminal respective one of the timing pulses generated from said timing signal generating circuit, and at the output terminal to the gate terminal of said corresponding semiconductor switch, thereby to control said semiconductor switches arranged on the same row with different timings.

11. A key telephone control system according to claim 10, wherein said control section further includes an OR circuit receiving a control output signal from said first control signal generating circuit, an inverter, a second AND circuit connected at two input terminals to the output terminals of said OR circuit and said inverter, and third AND circuits each connected at one input terminal to the output terminal of said second AND circuit and at the other input terminal receiving a different timing pulse from said timing signal generating circuit, and said second key service terminal sections each include a ninth transformer whose primary winding is connected to said crosspoint module and whose secondary winding is connected to an outside line via a channel switch, an impedance element connected between the center tap of the primary winding of said ninth transformer and a reference potential, a level detector connected at the input terminal to the junction between the center tap of the primary winding of said ninth transformer and said impedance element, a switch controller which responds to an output signal of said level detector to control said channel switch, and a fourth AND circuit which is connected at one input terminal to the output terminal of said level detector and receives at the other input terminal one of the timing pulses generated from said timing signal generator, and connected at the output terminal to the input terminal of said inverter.

12. A key telephone system according to claim 11, wherein said impedance element is a resistor.

13. A key telephone system according to claim 10, wherein said control section further includes an inverter and second AND circuits each connected at one input terminal to the output terminal of said inverter, receives at the other input terminal a control output signal from said first control signal generating circuit, and connected at the output terminal to one of the input terminals of corresponding one of said first AND circuits, and said second key service terminal sections each include a ninth transformer whose primary winding is connected to an outside line via a channel switch, an impedance element connected between the center tap of the primary winding of said ninth transformer and a reference potential, a level detector connected at one input terminal to the junction between the center tap of the primary winding of said ninth transformer and said impedance element, a switch controller which responds to an output signal of said level detector to control said channel switch, and a fourth AND circuit which is connected at one input terminal to the output terminal of said level detector and receives at the other input terminal one of the timing pulses generated from said timing signal generator, and connected at the output terminal to the input terminal of said inverter.

14. A key telephone system according to claim 13, wherein said impedance element is a resistor.

15. A key telephone system according to claim 8, wherein said control section includes a timing pulse generator for generating a plurality of different timing pulses, said hook signal detecting circuits each include a first flip-flop circuit which is driven by a different one of timing pulses generated from said timing pulse generator and is set in response to the hook signal from said first control signal generator and current sources which each respond to the set output signal from a corresponding one of said first flip-flop circuits to feed current to the crosspoint connected to the secondary winding of said fourth transformer through the center tap of the secondary winding of said fourth transformer.

16. A key telephone system according to claim 15, wherein said control section further includes an oscillator, said switching circuits each include a hold switch, said first control signal generators each respond to the actuation of said hold switch to apply a hold signal to the input circuit of said control section, the input circuit of said control section further includes second flip-flop circuits which are driven by different timing pulses generated from said timing pulse generator and are set in response to the hold signals from said respective first control signal generators, and a plurality of AND circuits each connected at one input terminal to the set output terminal of said second flip-flop circuit and at the other input terminal to said oscillator, and said current sources are respectively connected to feed to said crosspoint module a current in accordance with the output signals of said first flip-flop circuits and said AND circuits.

17. A key telephone system according to claim 16, wherein said second key service terminal section includes a ninth transformer having a primary winding connected to said crosspoint module and a secondary winding connected to an outside line through a channel switch, an impedance element connected between the center tap of the primary winding of said ninth transformer and a reference potential terminal, first and second detectors connected at the input terminals to the junction between the center tap of the primary winding of said ninth transformer and the impedance element, a NOR circuit connected at one input terminal to said second level detector and an oscillator, a third flip-flop circuit which responds to the output signal of said NOR circuit to be set and responds to the output signal of said first level detector to be reset, an OR circuit connected at one input terminal to said third flip-flop circuit and said first detector, and a switch controller which is connected to the output terminal of said OR circuit, and responds to the output signals of said first level detector and said third flip-flop circuit to control said channel switch.

18. A key telephone control system according to claim 17, wherein said second key service terminal section further includes a filter connected at the input terminal to the junction between the impedance element and the center tap of the primary winding of said ninth transformer, a second level detector connected at the input terminal to the output terminal of said filter, a flip-flop circuit connected at the set terminal to said second level detector and at the reset terminal to the output terminal of said first level detector, an OR circuit whose input terminals are connected to the output terminals of said flip-flop circuit and said first level detector and whose output terminal is connected to said switch controller, and first, second and third AND circuits of which the input terminals are connected to said incoming call signal detector, said first level detector and said flip-flop circuit, and said control section includes a timing signal generator producing timing pulses to said first, second and third AND circuits.

19. A key telephone system according to claim 18, wherein said control section further includes fourth, fifth and sixth AND circuits whose input terminals are connected to the output terminals of said first, second and third AND circuits, and further comprises an OR circuit whose input terminals are connected with the output terminals of said fourth to sixth AND circuits, said timing signal generator providing signals with different frequencies to the other input terminal of said fourth and sixth AND circuits and said fifth AND circuit being connected at the other input terminal to the output terminal of said third AND circuit via an inverter.

20. A key telephone system according to claim 8, wherein crosspoints of said crosspoint module are each constructed by paired thyristors.

21. A key telephone system according to claim 2, wherein the first key service terminal section of said key service unit includes at least one call signal generator and a crosspoint section for selectively connecting said call signal generator with said second key telephone terminal sections in accordance with an output signal of said control section.

22. A key telephone system according to claim 2, wherein said second key service terminal section includes a ninth transformer having primary winding connected to said crosspoint module and a secondary winding connected to an outside line via a channel switch taking two positions, an impedance element connected between the center tap of the primary winding of said ninth transformer and a reference potential terminal, a first level detector whose input terminal is connected to the junction between the center tap of the primary winding of said ninth transformer and said impedance element, an incoming call signal detector connected to an outside line via said channel switch, and a switch controller for controlling the position of said channel switch in accordance with an output signal of said first level detector.

23. A key telephone system according to claim 22, wherein said impedance element is a resistor.

24. A key telephone system according to claim 2, wherein said key service unit includes at least one intercom terminal section connected to the secondary winding of said fourth transformer via said crosspoint module, a decoder which decodes an output signal of said intercom terminal section and produces intercom line specifying signals through a plurality of output lines, and first AND circuits which are connected at one input terminal commonly to said second key service terminal section, and at the other input terminal to the output lines of said decoder through inverters, and said first key service terminal section includes a crosspoint section having a first group of crosspoints whose control terminals are connected to the output terminals of said AND circuits, respectively, and a second group of crosspoints whose control terminals are connected to the output lines of said decoder and which are each connected to the output terminal of said intercom terminal section.

25. A key telephone system according to claim 24, wherein said key service unit further includes second AND circuits whose first input terminals are connected to the output terminal of said first AND circuit, a first call signal generator connected commonly to the second input terminals of said second AND circuits, third AND circuits which are connected at one input terminal to the output lines of said decoder, and a second call signal generator commonly connected at the other input terminal to said third AND circuits.

26. A key telephone system according to claim 1, wherein said control section includes a clock and synchronizing signal generator for generating a clock signal and a synchronizing signal, an incoming call signal generator for detecting an incoming call signal transmitted through an outside line to said key service unit, and the output circuit of said control section includes a second control signal generating circuit in which the clock and synchronizing signals from said clock and synchronizing signal generator, and the incoming call signal from said incoming call signal detector are logically processed to produce a down-control signal including a fixed level component representing the synchronizing signal, a clock component with alternately changing polarity for representing the clock signal, and an incoming call component for representing the incoming call component of which the amplitude is larger than that of the clock component and the polarity changes alternately, and the down-control signal is applied to the first key telephone terminal section of said key telephone.

27. A key telephone system according to claim 26, wherein the first key telephone terminal section of said key telephone includes a first control signal receiving circuit in which three signals corresponding to said fixed level signal component, said clock pulse component and said incoming call pulse component are separately taken from the control signal of said second control signal generating circuit and the clock pulse component is supplied to the first control signal generating circuit of said key telephone, and a series to parallel converter which receives the incoming call pulse component from said signal receiving circuit and produces parallel output signals.

28. A key telephone system according to claim 27, wherein the first control signal generating circuit includes a plurality of key switches, a parallel to series converter of which input terminals are connected to said key switches, and a signal generator which receives a series signal from said parallel to series converter and a clock pulse component from said first control signal receiving circuit, and applies a key switch information signal corresponding to said key switch operation to the input circuit of said control section of said key service unit.

29. A key telephone system according to claim 1, wherein said first coupling section includes first, second and third transformers for coupling the handset, said first control signal generating circuit and said first key telephone terminal section of said each key telephone with said first, second and third transmission cables, and fourth, fifth and sixth transformers for coupling the other ends of said first, second and third transmission cables with said key service unit, and said second coupling section includes a pair of coupling lines connected at the output side to the center taps of the secondary windings of two of said first, second and third transformers, and a resistor connected between the center taps of the primary windings of corresponding two of said fourth, fifth and sixth transformers, said second key telephone terminal section includes a dial switch for transmitting a dial signal and a first switching circuit having, a hook switch which is closed when the handset is picked up and a first signal source connected between said hook switch and one of said coupling lines, said first switching circuit being coupled between said pair of coupling lines, and said first key service terminal section includes a first level detector of which the input terminal is connected to the junction between the center tap of the primary winding of said fourth transformer and the resistor, and a second signal source which responds to the output signal from said first level detector to feed current to the crosspoints of said crosspoint module connected to the secondary winding of said fourth transformer through the center tap of the secondary winding of said fourth transformer.

30. A key telephone system according to claim 29, wherein said second key telephone terminal section includes a third signal source connected to said dial switch to form a second switching circuit which is connected at one terminal to one of said pair of coupling lines, and a first adding circuit connected to add the output signals of said second switching circuits and produce an added signal to the other one of said pair of coupling lines, and said first key service terminal section includes a second level detector of which the input terminal is connected to the junction between the center tap of the secondary winding of said fourth transformer and the resistor, an oscillator which responds to the output signal of said second detector to produce an oscillation signal, and a second adding circuit for adding the output signals of said second power source and said oscillator.

31. A key telephone system according to claim 30, wherein said second key telephone terminal section further includes a third switching circuit having a hold switch and a fourth signal source connected to the hold switch, said third switching circuit being connected between said one of said pair of coupling lines and said first adding circuit.

32. A key telephone system comprising:
a plurality of key telephones each having a handset, a first control signal generator circuit producing an output signal for specifying a line to be used, and first, second and third key telephone terminal sections;
a plurality of transmission paths each having first, second and third transmission cables;
a key service unit including a crosspoint module, a control section having input and output circuits, at least one first key service terminal section and at least one second key service terminal section for coupling the crosspoint module with an outside line and a third key service terminal section; and
a plurality of coupling means each including first and second coupling sections, said first coupling section including first, second and third transformers for respectively coupling the handset, the first control signal generating circuit and the first key telephone terminal section of each key telephone with said first, second and third transmission cables, and fourth, fifth and sixth transformers for respectively coupling said first, second and third transmission cables at the other end with the crosspoint module and the input and output circuits of said control section in said key service unit, and said second coupling section including a seventh transformer whose primary winding is connected to said second key telephone terminal section and whose secondary winding is connected between the center taps of the secondary windings of said first and second transformers and an eighth transformer whose primary winding is connected between the center taps of the secondary windings of said fourth and fifth transformers and whose secondary winding is connected to said key service terminal section of said key service unit, wherein each of said third key telephone terminal sections is connected between the center taps of the secondary windings of corresponding ones of said third and seventh transformers and each of said third key service terminal sections is connected between the center taps of the primary windings of corresponding ones of said sixth and eighth transformers, and further responds to an incoming call signal to send a down-control signal to said first key telephone terminal section of each of said key telephones through said third transmission cable.

33. A key telephone system according to claim 32, wherein said third key telephone terminal section is a constant voltage circuit supplying a constant voltage to the key telephone and said third key service terminal section is a DC power source.

34. A key telephone system comprising:
a plurality of key telephones each having a handset, a first control signal generator circuit producing an output signal for specifying a line to be used, and first, second and third key telephone terminal sections;
a plurality of transmission paths each having first, second and third transmission cables;
a key service unit including a crosspoint module, a control section having input and output circuits, at least one first key service terminal section and at least one second key service terminal section for coupling the crosspoint module with an outside line and a third key service terminal section; and
a plurality of coupling means each including first and second coupling sections, said first coupling section including first, second and third transformers for respectively coupling the handset, the first control signal generating circuit and the first key telephone terminal section of each key telephone with said first, second and third transmission cables, and fourth, fifth and sixth transformers for respectively coupling said first, second and third transmission cables at the other end with the crosspoint module and the input and output circuits of said control section in said key service unit, and said second coupling section including a seventh transformer whose primary winding is connected to said second key telephone terminal section and whose secondary winding is connected between the center taps of the secondary windings of said first and second transformers and an eighth transformer whose primary winding is connected between the center taps of the secondary windings of said fourth and fifth transformers and whose secondary winding is connected to said first key service terminal section of said key service unit, wherein each of of said third key telephone terminal sections is connected between the center taps of the secondary windings of said second and third transformers and each of said third key service terminal section is connected between the center taps of the primary windings of said fifth and sixth transformers, and said control section responds to an up-control signal fed from said first control signal generating circuit via said second transmission cable to provide a control signal to said crosspoint module, thereby connecting said key telephone to said second key service terminal section connected to a specified line through said first transmission cable and said crosspoint module, and further responds to an incoming call signal to send a down-control signal to said first key telephone terminal section of each of said key telephone through said third transmission cable.

35. A key telephone system according to claim 34, wherein said third key telephone terminal section is a constant voltage circuit supplying a constant voltage to the key telephone and said third key service terminal section is a DC power source.

* * * * *